US012736314B1

(12) United States Patent
Hedeen et al.

(10) Patent No.: US 12,736,314 B1
(45) Date of Patent: Sep. 15, 2026

(54) GUN MOUNTED RECORDING DEVICE WITH QUICK RELEASE BATTERY

(71) Applicant: Laser Aiming Systems Corporation, Maple Plain, MN (US)

(72) Inventors: Brian Hedeen, Orono, MN (US); Casey R. Carlson, Young America, MN (US)

(73) Assignee: Laser Aiming Systems Corporation, Maple Plain, MN (US)

( * ) Notice: Subject to any disclaimer, the term of this patent is extended or adjusted under 35 U.S.C. 154(b) by 12 days.

(21) Appl. No.: 18/949,241

(22) Filed: Nov. 15, 2024

Related U.S. Application Data

(63) Continuation of application No. 17/403,837, filed on Aug. 16, 2021, now Pat. No. 12,173,992, which is a (Continued)

(51) Int. Cl.
*F41J 5/10* (2006.01)
*F41G 11/00* (2006.01)
(Continued)

(52) U.S. Cl.
CPC ................ *F41J 5/10* (2013.01); *H04N 5/907* (2013.01); *H04N 23/51* (2023.01); *H04N 23/54* (2023.01); *H04N 23/57* (2023.01); *F41G 11/004* (2013.01)

(58) Field of Classification Search
None
See application file for complete search history.

(56) References Cited

U.S. PATENT DOCUMENTS 2,138,978 A 12/1938 Meine
2,303,479 A 12/1942 Lesnick
(Continued)

FOREIGN PATENT DOCUMENTS

CA 2452538 C 6/2008
CA 2592225 C 8/2011
(Continued)

OTHER PUBLICATIONS

JP 2007087707 A (Patent Publication & English Translation) (Year: 2007).*
(Continued)

*Primary Examiner* — Reginald S Tillman, Jr.
(74) *Attorney, Agent, or Firm* — Christensen, Fonder, Dardi & Busse PLLC; Andrew H. Auderieth

(57) ABSTRACT

A weapon mounted recording device including a recording unit and a power source unit releasably coupled with the recording unit. The recording unit may include a recording module, a processing device and memory positioned within housing of the recording unit. The power source unit includes a housing containing a battery and memory and a locking mechanism configured to engage the housing of the recording unit, securing the power source unit to the recording unit, and including a push button assembly. The push button assembly including a resilient biasing portion, wherein depression of the push button member effectuates deflection of the biasing portion and movement of the engagement portion from an engagement position to a release position, thereby releasing the engagement portion from the coupling portion and facilitating removal of the power source unit from the recording unit.

20 Claims, 12 Drawing Sheets

Related U.S. Application Data continuation-in-part of application No. 17/382,291, filed on Jul. 21, 2021, now Pat. No. 12,130,121.

(60) Provisional application No. 63/065,869, filed on Aug. 14, 2020, provisional application No. 63/054,577, filed on Jul. 21, 2020.

(51) Int. Cl.

*H04N 5/907* (2006.01)
*H04N 23/51* (2023.01)
*H04N 23/54* (2023.01)
*H04N 23/57* (2023.01)

(56) References Cited

U.S. PATENT DOCUMENTS 2,546,242 A 3/1951 Stinson
3,239,658 A 3/1966 Castaldo
3,405,448 A 10/1968 Neatherby
4,310,980 A 1/1982 Pilkington
4,494,328 A 1/1985 Stevens
4,539,769 A 9/1985 Stevens et al.
4,547,937 A 10/1985 Collins
4,571,870 A 2/1986 Heideman et al.
4,580,362 A 4/1986 Stevens
4,713,889 A 12/1987 Santiago
4,738,044 A 4/1988 Osterhout
4,777,754 A 10/1988 Reynolds, Jr.
5,005,307 A 4/1991 Horne et al.
5,025,564 A 6/1991 Sanders
5,033,219 A 7/1991 Johnson et al.
5,052,138 A 10/1991 Crain
5,107,612 A 4/1992 Bechtel
5,142,805 A 9/1992 Horne et al.
5,215,238 A 6/1993 Baruch
5,282,592 A 2/1994 Ma
5,282,594 A 2/1994 Huang
5,303,495 A 4/1994 Harthcock
5,307,053 A 4/1994 Wills et al.
D347,018 S 5/1994 Jehn
D349,510 S 8/1994 Tomita
5,355,608 A 10/1994 Teetzel
5,406,730 A 4/1995 Sayre
5,425,299 A 6/1995 Teetzel
5,430,967 A 7/1995 Woodman, III et al.
5,481,819 A 1/1996 Teetzel
5,566,486 A 10/1996 Brinkley
5,581,898 A 12/1996 Thummel
5,584,137 A 12/1996 Teetzel
5,591,032 A 1/1997 Powell et al.
5,642,581 A 7/1997 Herold et al.
5,685,105 A 11/1997 Teetzel
5,706,600 A 1/1998 Toole et al.
5,735,070 A 4/1998 Vasquez et al.
5,755,056 A 5/1998 Danner et al.
5,784,823 A 7/1998 Chen
5,787,628 A 8/1998 Teetzel
5,799,432 A 9/1998 Wright, Sr. et al.
5,822,905 A 10/1998 Teetzel
5,826,360 A 10/1998 Herold et al.
5,867,930 A 2/1999 Kaminski et al.
5,918,304 A 6/1999 Gartz
6,062,208 A 5/2000 Seefeldt et al.
6,094,850 A 8/2000 Villani
6,112,962 A 9/2000 Matthews
6,185,854 B1 2/2001 Solinsky et al.
6,295,793 B1 10/2001 Takayanagi
6,321,478 B1 11/2001 Klebes
6,360,468 B1 3/2002 Constant et al.
6,378,237 B1 4/2002 Matthews et al.
6,393,752 B1 5/2002 Oliver et al.
6,397,508 B1 6/2002 Constant et al.
6,421,944 B1 7/2002 Klebes et al.
6,421,947 B1 7/2002 Fuller
6,493,977 B1 12/2002 Liebenberg et al.
6,539,661 B2 4/2003 Hope
6,571,503 B2 6/2003 Thorpe
6,574,901 B1 6/2003 Solinsky et al.
6,578,311 B2 6/2003 Danielson et al.
6,615,531 B1 9/2003 Holmberg
6,637,144 B2 10/2003 Nelson et al.
6,643,968 B2 11/2003 Glock
6,705,038 B2 3/2004 Davenport et al.
6,735,897 B1 5/2004 Schmiller et al.
6,779,518 B2 8/2004 Dobbins
6,785,996 B2 9/2004 Danner et al.
6,802,147 B2 10/2004 Haefeli et al.
6,860,259 B2 3/2005 Rice et al.
6,898,890 B2 5/2005 Gaber
6,935,864 B2 8/2005 Shechter et al.
6,941,693 B2 9/2005 Rice et al.
6,952,881 B2 10/2005 McGivern
7,032,342 B2 4/2006 Pikielny
7,117,624 B2 10/2006 Kim
7,143,644 B2 12/2006 Johnson et al.
7,158,167 B1 1/2007 Yerazunis et al.
7,185,646 B2 3/2007 Jones
7,225,577 B1 6/2007 Nang
7,226,183 B2 6/2007 Salli et al.
7,234,260 B2 6/2007 Acarreta
D548,385 S 8/2007 Sharrah et al.
7,260,912 B2 8/2007 Liu
7,305,790 B2 12/2007 Kay
7,334,365 B2 2/2008 Kim
7,346,366 B2 3/2008 Park
7,356,956 B2 4/2008 Schinazi et al.
D568,508 S 5/2008 Howe et al.
D578,599 S 10/2008 Cheng
7,509,766 B2 3/2009 Vasquez
7,523,583 B2 4/2009 Cheng
7,591,098 B2 9/2009 Matthews et al.
D603,478 S 11/2009 Hughes
7,644,839 B2 1/2010 Mcnulty, Jr.
7,661,217 B2 2/2010 Pikielny
D612,756 S 3/2010 D'Amelio et al.
D612,970 S 3/2010 Sharrah et al.
7,669,356 B2 3/2010 Joannes et al.
7,716,863 B1 5/2010 Johnson et al.
7,730,654 B2 6/2010 Kim
7,743,547 B2 6/2010 Houde-Walter
7,797,873 B2 9/2010 Gering et al.
7,802,391 B2 9/2010 Quinn et al.
7,810,273 B2 10/2010 Koch et al.
D628,323 S 11/2010 Matthews et al.
D628,324 S 11/2010 Matthews et al.
7,866,515 B1 1/2011 Buis et al.
D636,049 S 4/2011 Hughes et al.
D636,837 S 4/2011 Hughes et al.
7,926,219 B2 4/2011 Reimer
7,927,102 B2 4/2011 Jones et al.
8,009,060 B2 8/2011 Kramer et al.
8,019,278 B2 9/2011 Baraz et al.
8,028,461 B2 10/2011 NuDyke
8,046,946 B2 11/2011 Packer et al.
8,109,032 B2 2/2012 Faifer
8,117,778 B2 2/2012 Clark et al.
8,118,016 B2 2/2012 Italia et al.
8,132,355 B1 3/2012 Kincaid et al.
8,132,496 B2 3/2012 Zukowski
8,160,727 B2 * 4/2012 Coonan ................ G06F 1/1632
361/679.02
8,166,698 B2 5/2012 Raviv et al.
8,176,667 B2 5/2012 Kamal et al.
8,182,109 B2 5/2012 Matthews et al.
8,186,086 B2 5/2012 Gur-Ari et al.
8,191,297 B2 6/2012 Gwillim, Jr.
8,196,331 B2 6/2012 Chen et al.
8,215,044 B2 7/2012 Arbouw
8,220,946 B1 7/2012 Teetzel
8,223,019 B2 7/2012 August et al.
8,256,154 B2 9/2012 Danielson et al.
D669,553 S 10/2012 Hughes et al.
D669,958 S 10/2012 Essig et al.

(56) References Cited

U.S. PATENT DOCUMENTS

D669,959 S 10/2012 Johnston et al.
D672,005 S 12/2012 Hedeen et al.
8,336,247 B2 12/2012 Haering
8,339,257 B2 12/2012 Cazanas et al.
D674,525 S 1/2013 Sharrah et al.
D676,919 S 2/2013 Delgado Acarreta
8,371,729 B2 2/2013 Sharrah et al.
D677,178 S 3/2013 Delgado Acarreta
8,387,295 B2 3/2013 Glock
8,397,705 B2 3/2013 DeHaan et al.
8,418,388 B2 4/2013 Ferrarini et al.
D684,234 S 6/2013 Delgado Acarreta
D684,646 S 6/2013 Delgado Acarreta
D684,650 S 6/2013 Delgado Acarreta
D684,651 S 6/2013 Delgado Acarreta
D684,652 S 6/2013 Delgado Acarreta
8,459,552 B2 6/2013 Arbouw
8,464,451 B2 6/2013 McRae
8,464,452 B2 6/2013 Harper
8,474,172 B2 7/2013 Ivtsenkov et al.
8,485,085 B2 7/2013 Goree et al.
D690,788 S 10/2013 Acarreta
8,571,815 B2 10/2013 Bar-David et al.
D693,421 S 11/2013 Acarreta
8,578,920 B2 11/2013 Estrate
8,601,733 B2 12/2013 Gabay et al.
8,651,381 B2 2/2014 Rudich
8,656,820 B1 2/2014 Kertis, Jr. et al.
8,683,733 B2 4/2014 Gross et al.
8,690,032 B2 4/2014 Baumann et al.
8,713,844 B2 5/2014 Tuller, Jr. et al.
8,720,092 B2 5/2014 Gussalli Beretta et al.
8,733,006 B2 5/2014 Williams et al.
8,733,007 B2 5/2014 Hatfield
8,738,330 B1 5/2014 DiMartino et al.
D708,290 S 7/2014 Acarreta
D709,158 S 7/2014 Wells
D709,585 S 7/2014 Klecker et al.
8,770,978 B2 7/2014 Botten
D712,001 S 8/2014 Wells
D713,486 S 9/2014 Acarreta
8,826,575 B2 9/2014 Ufer et al.
8,827,706 B2 9/2014 Hogan, Jr.
8,850,730 B2 10/2014 Clark et al.
8,857,091 B2 10/2014 Delgado Acarreta
8,875,433 B2 11/2014 Beckman
8,936,193 B2 1/2015 McHale et al.
8,959,824 B2 2/2015 Sammut et al.
8,973,294 B2 3/2015 Delgado Acarreta
8,978,539 B2 3/2015 Teetzel et al.
8,995,141 B1 3/2015 Rathi et al.
D732,134 S 6/2015 Wells
9,057,571 B2 6/2015 Kemmerer et al.
9,057,584 B2 6/2015 Chung
9,068,785 B2 6/2015 Ball
9,114,312 B2 8/2015 Liao
D745,625 S 12/2015 Acarreta et al.
9,212,857 B2 12/2015 Loreman
9,217,616 B2 12/2015 Sullivan et al.
D747,757 S 1/2016 Daniel
9,273,918 B2 3/2016 Amit et al.
9,303,937 B2 4/2016 Acarreta
9,310,163 B2 4/2016 Bay
9,316,461 B1 4/2016 Gwillim, Jr.
D757,206 S 5/2016 Delgado Acarreta et al.
9,341,424 B2 5/2016 Allan
9,435,594 B2 9/2016 Davison et al.
9,437,500 B1 9/2016 Hong
9,557,130 B2 1/2017 Shneorson et al.
D781,983 S 3/2017 Wells
9,612,068 B2 4/2017 Burden
9,658,031 B1 5/2017 Hedeen et al.
9,677,852 B2 6/2017 Tikochinski et al.
9,728,865 B1 8/2017 Voli
9,759,505 B2 9/2017 Al Abdouli et al.
9,784,511 B2 10/2017 Faughn
9,797,667 B2 10/2017 Demierre et al.
9,811,079 B2 11/2017 Theiss
9,835,395 B2 12/2017 Ruby et al.
9,897,407 B2 2/2018 Kramer
D815,239 S 4/2018 Cheng et al.
9,934,623 B2 4/2018 Jordan et al.
9,958,228 B2 5/2018 Stewart et al.
10,323,894 B2 6/2019 Imbriano et al.
10,323,903 B2 6/2019 Hedeen et al.
10,359,246 B2 7/2019 Faughn
10,459,678 B2 10/2019 Samo
10,466,012 B2 11/2019 Uhr
10,495,398 B2 12/2019 Kramer
D873,946 S 1/2020 Hedeen et al.
10,557,676 B2 2/2020 Masarik et al.
10,591,250 B2 3/2020 Mock et al.
10,962,314 B2 3/2021 Hedeen et al.
11,094,969 B2 8/2021 Hedeen et al.
11,306,987 B2 4/2022 Hedeen et al.
11,561,057 B2 1/2023 Hedeen et al.
11,750,032 B2 9/2023 Hedeen et al.
2002/0067425 A1 6/2002 Iverson
2002/0129535 A1 9/2002 Osborn, II
2003/0029072 A1 2/2003 Danielson et al.
2003/0101632 A1 6/2003 Davenport et al.
2003/0195046 A1 10/2003 Bartsch
2004/0068913 A1 4/2004 Solinsky et al.
2004/0244259 A1 12/2004 Davenport et al.
2005/0066567 A1 3/2005 Newkirk et al.
2005/0115142 A1 6/2005 Kim
2005/0257415 A1 11/2005 Solinsky et al.
2005/0279790 A1 12/2005 Lowe
2006/0026886 A1 2/2006 Doukas
2006/0042142 A1 3/2006 Sinha
2006/0082730 A1 4/2006 Franks
2006/0116183 A1 6/2006 Infanti
2006/0162226 A1 7/2006 Tai
2006/0204835 A1 9/2006 Kelsey et al.
2006/0216980 A1 9/2006 Lewis
2007/0000483 A1 1/2007 Tsurumoto
2007/0061508 A1 3/2007 Zweighaft
2007/0068058 A1 3/2007 Remo
2007/0079538 A1 4/2007 Smith
2007/0086749 A1 4/2007 Isobe et al.
2007/0193103 A1 8/2007 Sun
2007/0257987 A1 11/2007 Wang
2008/0028660 A1 2/2008 Gussalli Beretta
2008/0060248 A1 3/2008 Dine et al.
2008/0094473 A1 4/2008 Rom
2008/0099224 A1 5/2008 Hofmann et al.
2008/0112698 A1 5/2008 Ray
2008/0127538 A1 6/2008 Barrett et al.
2008/0131848 A1 6/2008 Wilson et al.
2008/0163749 A1 7/2008 Reimer
2008/0202010 A1 8/2008 Matthews et al.
2008/0272162 A1 11/2008 Gamble
2009/0084015 A1 4/2009 Compton et al.
2009/0314813 A1 12/2009 Woolery
2010/0031808 A1 2/2010 Whitlow et al.
2010/0178540 A1 7/2010 Kelsey et al.
2010/0275497 A1 11/2010 Brentzel
2010/0277591 A1 11/2010 Kowalsky
2010/0299985 A1 12/2010 Delgado Acarreta
2011/0078936 A1 4/2011 Gates
2011/0111374 A1 5/2011 Charles
2011/0113664 A1 5/2011 Delgado Acarreta
2011/0252681 A1 10/2011 Houde-Walter et al.
2011/0252682 A1 10/2011 Delgado Acarreta
2011/0283585 A1 11/2011 Cabahug et al.
2012/0042559 A1 2/2012 Bockmon
2012/0144715 A1 6/2012 Simpson
2012/0152103 A1 6/2012 Testa et al.
2012/0159833 A1 6/2012 Hakanson et al.
2012/0167423 A1 7/2012 Kindt et al.
2013/0108991 A1 5/2013 Walls
2013/0125438 A1 5/2013 Delgado Acarreta
2013/0152447 A1 6/2013 Östergren et al.
2013/0180143 A1 7/2013 Delgado Acarreta

(56) References Cited

U.S. PATENT DOCUMENTS

| | | | |
|---|---|---|---|
| 2013/0219762 | A1 | 8/2013 | Delgado Acarreta |
| 2013/0263491 | A1 | 10/2013 | Jung et al. |
| 2013/0337416 | A1 | 12/2013 | Guissin |
| 2014/0150316 | A1 | 6/2014 | Acarreta |
| 2014/0150323 | A1 | 6/2014 | Kowalczyk, Jr. et al. |
| 2014/0184788 | A1 | 7/2014 | McHale et al. |
| 2014/0210646 | A1 | 7/2014 | Subramanya |
| 2014/0215885 | A1 | 8/2014 | Sullivan et al. |
| 2014/0230306 | A1 | 8/2014 | Arachequesne |
| 2014/0317988 | A1 | 10/2014 | Battis et al. |
| 2014/0378088 | A1 | 12/2014 | Goel et al. |
| 2015/0059225 | A1 | 3/2015 | Huang |
| 2015/0075047 | A1 | 3/2015 | August et al. |
| 2015/0184978 | A1 | 7/2015 | Hedeen |
| 2015/0198406 | A1 | 7/2015 | Ling |
| 2015/0226521 | A1 | 8/2015 | Patterson et al. |
| 2015/0369553 | A1 | 12/2015 | Stussak |
| 2015/0369554 | A1 | 12/2015 | Kramer |
| 2015/0377572 | A1 | 12/2015 | Darragjati |
| 2016/0033221 | A1 | 2/2016 | Schmehl et al. |
| 2016/0069629 | A1 | 3/2016 | Seckman |
| 2016/0069640 | A1 | 3/2016 | Pretorius |
| 2016/0165192 | A1 | 6/2016 | Saatchi et al. |
| 2016/0169608 | A1 | 6/2016 | Schulz et al. |
| 2016/0172876 | A1 | 6/2016 | Stewart |
| 2016/0173832 | A1 | 6/2016 | Stewart |
| 2016/0195366 | A1 | 7/2016 | Kowalczyk et al. |
| 2016/0209167 | A1 | 7/2016 | Wells |
| 2016/0286156 | A1 | 9/2016 | Kovac |
| 2016/0305740 | A1 | 10/2016 | O'Donnell et al. |
| 2016/0327365 | A1 | 11/2016 | Collin et al. |
| 2016/0334177 | A1 | 11/2016 | Green |
| 2016/0349005 | A1 | 12/2016 | Gale et al. |
| 2017/0059265 | A1 | 3/2017 | Winter |
| 2017/0150448 | A1 | 5/2017 | Stagg et al. |
| 2017/0155269 | A1 | 6/2017 | Swift |
| 2017/0176139 | A1 | 6/2017 | Zhang et al. |
| 2017/0227310 | A1 | 8/2017 | Gorza et al. |
| 2017/0241742 | A1 | 8/2017 | Davidson et al. |
| 2017/0248388 | A1 | 8/2017 | Young et al. |
| 2017/0316531 | A1 | 11/2017 | Smith |
| 2017/0336160 | A1 | 11/2017 | Walther et al. |
| 2018/0041736 | A1 | 2/2018 | Gagnon et al. |
| 2018/0094900 | A1 | 4/2018 | Sharrah et al. |
| 2018/0106568 | A1 | 4/2018 | Hedeen et al. |
| 2018/0238649 | A1 | 8/2018 | Winiecki |
| 2018/0299217 | A1 | 10/2018 | Hedeen et al. |
| 2018/0321015 | A1 | 11/2018 | Hedeen et al. |
| 2019/0063864 | A1 | 2/2019 | Stewart et al. |
| 2019/0208092 | A1 | 7/2019 | Patton |
| 2019/0222771 | A1 | 7/2019 | Hedeen et al. |
| 2019/0304210 | A1 | 10/2019 | Jordan et al. |
| 2020/0109909 | A1 | 4/2020 | Stewart et al. |
| 2020/0158473 | A1 | 5/2020 | Wells et al. |
| 2021/0010769 | A1 | 1/2021 | Czarnecki et al. |
| 2021/0310759 | A1 | 10/2021 | Hedeen et al. |
| 2022/0021815 | A1 | 1/2022 | Hedeen et al. |
| 2022/0316833 | A1 | 10/2022 | Hedeen et al. |
| 2023/0384047 | A1 | 11/2023 | Hedeen et al. |
| 2024/0178701 | A1 | 5/2024 | Hedeen et al. |

FOREIGN PATENT DOCUMENTS

| | | | |
|---|---|---|---|
| CA | 2591001 | C | 9/2011 |
| CN | 101126615 | A | 2/2008 |
| DE | 3911804 | A1 | 10/1990 |
| DE | 4022038 | A1 | 1/1992 |
| DE | 4022038 | C2 | 3/1999 |
| DE | 102010054245 | A1 | 6/2012 |
| EP | 1514070 | B1 | 4/2014 |
| EP | 1646837 | B1 | 8/2014 |
| GB | 2182424 | A | 5/1987 |
| GB | 2397128 | A | 7/2004 |
| JP | H04298615 | A | 10/1992 |
| JP | H1089894 | A | 4/1998 |
| JP | 2002277193 | A | 9/2002 |
| JP | 2008064406 | A | 3/2008 |
| JP | 2008175526 | A | 7/2008 |
| JP | 4298615 | B2 | 7/2009 |
| JP | 4395357 | B2 | 1/2010 |
| JP | 4594334 | B2 | 10/2010 |
| JP | 4923749 | B2 | 4/2012 |
| JP | 4923750 | B2 | 4/2012 |
| JP | 4996963 | B2 | 8/2012 |
| JP | 2012215373 | A | 11/2012 |
| JP | 2013130373 | A | 7/2013 |
| KR | 100914270 | B1 | 5/2009 |
| KR | 20110035058 | A | 4/2011 |
| KR | 20140046853 | A | 4/2014 |
| RU | 2360208 | C2 | 1/2009 |
| WO | WO2009151713 | A2 | 12/2009 |
| WO | WO2013104807 | A1 | 7/2013 |
| WO | WO2014184875 | A1 | 11/2014 |
| WO | WO2016181234 | A1 | 11/2016 |
| WO | WO2016187713 | A1 | 12/2016 |
| WO | WO2017031426 | A1 | 2/2017 |

OTHER PUBLICATIONS ammoland.com [online], "Magcount Because You Gotta Know" MagCount Ammunition Counting Technology Demonstration, published on Oct. 13, 2010, retrieved from URL <https://www.ammoland.com/2010/10/magcount-because-you-gotta-know>, 4 pages.

Electronics Tutorials [online], "Hall Effect Sensor and How Magnets Make It Work," published on Jun. 3, 2017, retrieved Nov. 3, 2017 from URL <http://www.electronics-tutorials.ws/electromagnestism/hall-effecl.hlml>, 12 pages.

International Preliminary Report on Patentability in International Patent Application No. PCT/US2017/056780, dated Apr. 25, 2019, 9 pages.

International Search Report and Written Opinion issued in PCT/US17/56780, dated Jan. 2, 2018, 17 pages.

quickdrawgunmagnets.com [online], "Quick Draw Gun Magnets," Gun Magnets & Blog, published Nov. 7, 2013, retrieved on Jun. 23, 2015, from URL <http://quickdrawgunmagnets.com>, 7 pages.

thefirearmblog.com [online], "Radetec AmmoControl Digital Counter and Led Advisor", published on Jan. 28, 2013, retrieved from URL <https://www.thefirearmblog.com/blog/2013/01/28/radetec-ammocontrol-digital-counter-and-led-advisor>, 4 pages.

Wikipedia.com [online], "Pogo pin," published Mar. 15, 2021, retrieved on Jul. 13, 2021, retrieved from <https://en.wikipedia.org/wiki/Pogo_pin>, 4 pages.

windhamweaponry.com [online], "Magnetic Gun Cleaning Mat," retrieved on Nov. 7, 2013, from URL <http://www.windhamweaponry.com/shopexd.asp?id=260#axzz3dlqytt0U>, 8 pages.

youtube.com [online], "Bullet Counter 2.0", published on Mar. 24, 2011, retrieved from URL <https://www.youtube.com/watch?v=cnx9yT5py8E>, 3 pages.

youtube.com [online], "Full-Auto Nerf Rayven", published on Apr. 22, 2013, retrieved from URL <https://www.youtube.com/watch?v=441WL_NJOQ8>, 3 pages.

youtube.com [online], "Lage Manufacturing MAX-41A Real Aliens Pulse Rifle", published Jan. 26, 2014, retrieved from URL <https://www.youtube.com/watch?v=XT90YzPlhVE>, 4 pages.

youtube.com [online], "Review: Aliens Ammo Counter! from Blasterparts—AKA the most Awesome accessory Ever!", uploaded by GriffinMods, published on Nov. 23, 2013, retrieved from URL <https://www.youtube.com/watch?n=N7U3xAo6obE>, 3 pages.

* cited by examiner

GUN MOUNTED RECORDING DEVICE WITH QUICK RELEASE BATTERY

CROSS-REFERENCE TO RELATED APPLICATIONS

This application is a continuation of U.S. patent application Ser. No. 17/403,837, filed Aug. 16, 2021, which claims the benefit of U.S. Provisional Patent Application No. 63/065,869, filed Aug. 14, 2020, and is a continuation-in-part application of U.S. patent application Ser. No. 17/382,291, filed Jul. 21, 2021, now U.S. Pat. No. 12,130,121, which claims the benefit of U.S. Provisional Patent Application No. 63/054,577, filed Jul. 21, 2020, all of which are incorporated herein by reference in their entireties.

FIELD OF THE DISCLOSURE

The present disclosure relates to gun-mounted recording devices, and more specifically, to recording devices including removable power source units having a quick release locking mechanism and a data redundancy and tracking system including hardware tracking features.

BACKGROUND

Law enforcement officers and non-law enforcement people may use body cameras and/or other types of cameras to record events when using guns, such as encounters between a gun's user and one or more third parties. In many instances, though, a law enforcement officer and/or non-law enforcement person may unintentionally block the view of the camera with his/her arms when the gun is drawn. Additionally, or alternatively, the person may not activate the body camera at the appropriate time. In these instances, body cameras may not provide support that the law enforcement officer's use of the gun was justified or unjustified and/or may not record the event that the non-law enforcement person wishes to record. Stationary cameras and/or non-stationary cameras, on the other hand, may not provide the best perspective of an event, especially if a user is moving. Accordingly, body cameras suffer from many drawbacks including failure to activate at appropriate times, obstructed views depending on the positioning of the body camera and/or providing a less than desirable perspective of an event.

Embodiments of the present disclosure may overcome these limitations. In particular, the embodiments herein disclose gun-mounted recording devices. Additionally, upon determination of an event, a recording device mounted to a gun may transition from a lower-power state to a higher-power state automatically. Embodiments of the present disclosure may also have the advantage of eliminating user discretion for when/if to record an event. Furthermore, the embodiments provided herein may be used by law enforcement and non-law enforcement when no other recording device is currently being used.

As used herein, "events" may be occurrences when a gun is deployed from a previously un-deployed position. For example, an event may be when a user (e.g., law enforcement and/or non-law enforcement) deploys his/her gun from his/her holster during an encounter between the user and a third party. As another example, an event may be when a user of a gun deploys a gun from a safe and/or picks up the gun from a flat surface, a nightstand drawer, an automobile glove box, from clothing, gun case, duty belt and/or the like. However, these are only examples and not meant to be limiting. In addition, while the term "gun" is being used throughout this description, the recording device may be coupled to other devices that may not be considered guns, such as bows, crossbows and/or other devices not considered guns that shoot projectiles.

SUMMARY

One or more embodiments are directed to a system for data retention and hardware tracking of event recorders with a removable power source unit. In one or more embodiments and described further below, the power source unit may additionally include memory. In such embodiments, the power source unit may function as both a battery for powering operation of the event recording device and as a data store for information collected by the device. Furthermore, in various embodiments the memory allows for data redundancy in the recording device. Similarly, in various embodiments the memory of the power source unit allows for easy data transfer from the recording device to an external storage system.

For example, in one or more embodiments, one or more charging nodes or docking stations may be configured to automatically download and/or transfer stored information from the memory to a more permanent database. In such a manner data transfer from the recording device may be accomplished easily in the regular and required process of recharging the power source unit, obviating any requirements for removal of the recording device from the gun or other more complicated processes for transferring saved data.

One or more embodiments are directed to a recording device, wherein the recording device includes a recording unit and a power source unit removably coupled with housing of the recording unit. In embodiments, recording unit may include a recording module, a processing device and memory; and the power source unit may include a battery for providing power to the recording unit, and memory configured to store data recorded by the recording unit and to connect with a server and/or external communication device for transfer of data stored therein. In one or more embodiments, the memory of each of the recording unit and the power source unit includes a redundant data file set, each redundant data file set including one or more data files having bits of recording and/or status data stored therein. In embodiments, the redundant data set of the recording unit and the power source unit are synchronized to mirror the respective redundant data files. In embodiments, the power source unit of the recording device is configured to connect with a server and/or external communication device for charging and/or networking with the memory of the power source unit. In embodiments, one or more of the recording devices may be included in a data management system and associated with a common network, a server and/or an external communications device.

In one or more embodiments, memory of each of the recording device recording unit and the power source unit stores and maintains a redundant data file set. Each redundant data file set may include one or more data files having certain recording and/or status data stored therein. In embodiments, the recording unit and the power source unit may be configured to synchronize the redundant data files of the recording unit and the power source unit, such that the data therein is mirrored. In embodiments, such redundant data files may be used for data integrity and security.

In one or more embodiments, a weapon mounted recording device including a recording unit comprising a housing having a coupling portion and a recording module within the housing and a power source unit removably coupled with the housing of the recording unit. The power source unit may include a battery for providing power to the recording unit while attached thereto and during use. In embodiments, the power source unit may include a housing defining a receptacle configured to receive and contain the battery and a locking mechanism configured to engage the housing of the recording unit, securing the power source unit to the recording unit. The locking mechanism may include a push button assembly, wherein the push button assembly comprises a push button member comprising an engagement portion configured to engage the coupling portion and a resilient biasing portion. The resilient biasing portion may have a first portion engaging the push button member and a second portion engaging the housing of the power source unit, wherein the resilient biasing portion biases the push button member away from the housing of the power source unit and the engagement portion into an engagement position. Depression of the push button member effectuates deflection of the biasing portion and movement of the engagement portion from an engagement position to a release position, thereby releasing the engagement portion from the coupling portion and facilitating removal of the power source unit from the recording unit.

In one or more embodiments, recording devices include a recording unit and a power source unit removably coupled with the housing of the recording unit. The power source unit includes a battery for providing power to the recording unit while attached thereto and during use and memory. In embodiments, the power source unit may include a housing having a cover portion and a lower housing and defining a receptacle configured to receive and contain the battery and a locking mechanism configured to engage the housing of the recording unit, securing the power source unit to the recording unit. In one or more embodiments, the locking mechanism includes a push button assembly including a push button member and a resilient biasing portion engaging and biasing the push button member away from the housing of the power source unit and into an engagement position. In embodiments, depression of the push button member effectuates deflection of the biasing portion and movement of the engagement portion from an engagement position to a release position, thereby releasing the engagement portion from the coupling portion and facilitating quick and easy removal of the power source unit from the recording unit.

The above summary is not intended to describe each illustrated embodiment or every implementation of the present disclosure.

BRIEF DESCRIPTION OF THE SEVERAL VIEWS OF THE DRAWINGS

The drawings included in the present application are incorporated into, and form part of, the specification. They illustrate embodiments of the present disclosure and, along with the description, serve to explain the principles of the disclosure. The drawings are only illustrative of certain embodiments and do not limit the disclosure.

Figure 1:
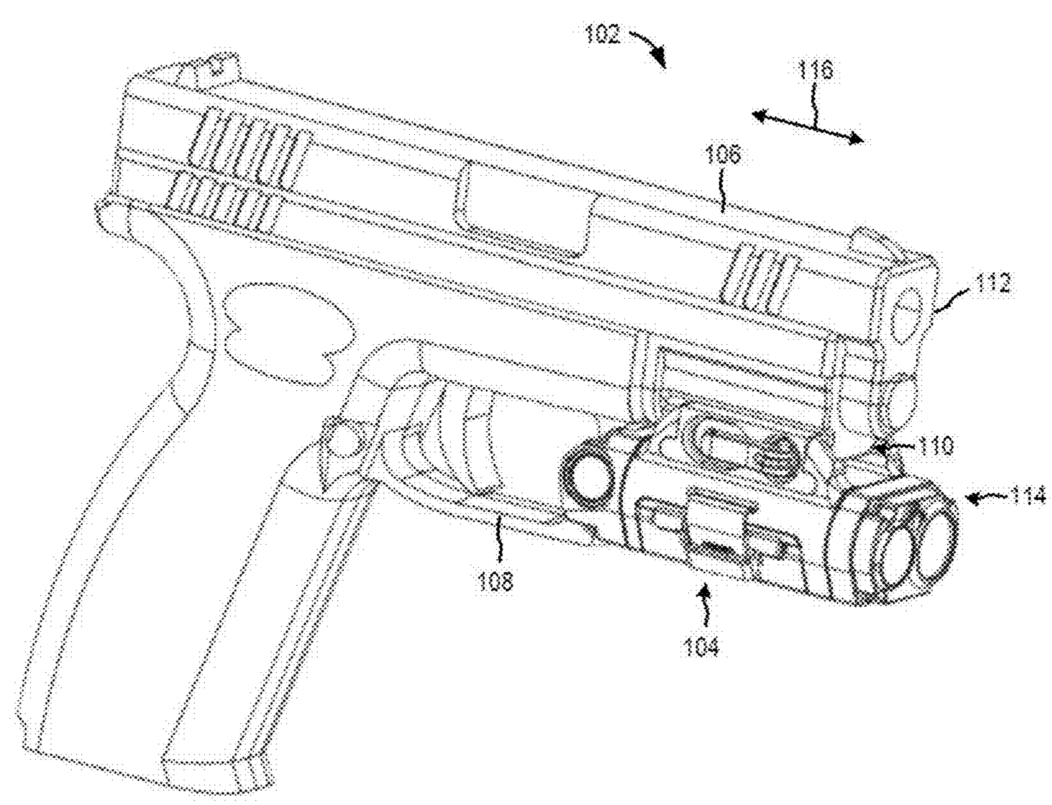
FIG. 1 depicts a perspective view of a handgun with a recording device attached thereto, according to one or more embodiments of the disclosure.

While the embodiments of the disclosure are amenable to various modifications and alternative forms, specifics thereof have been shown by way of example in the drawings and will be described in detail. It should be understood, however, that the intention is not to limit the disclosure to the particular embodiments described. On the contrary, the intention is to cover all modifications, equivalents, and alternatives falling within the spirit and scope of the disclosure.

DETAILED DESCRIPTION

Figure 2A:
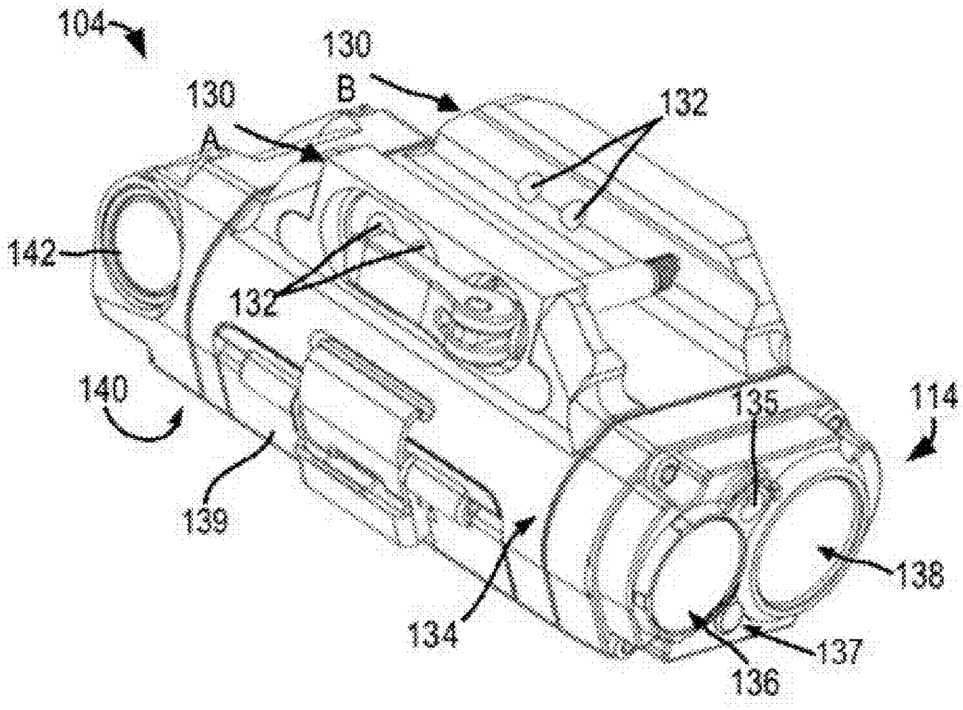
FIG. 2A depicts a top perspective view of a recording device and rail set attached thereto, according to one or more embodiments of the disclosure.
Figure 2B:
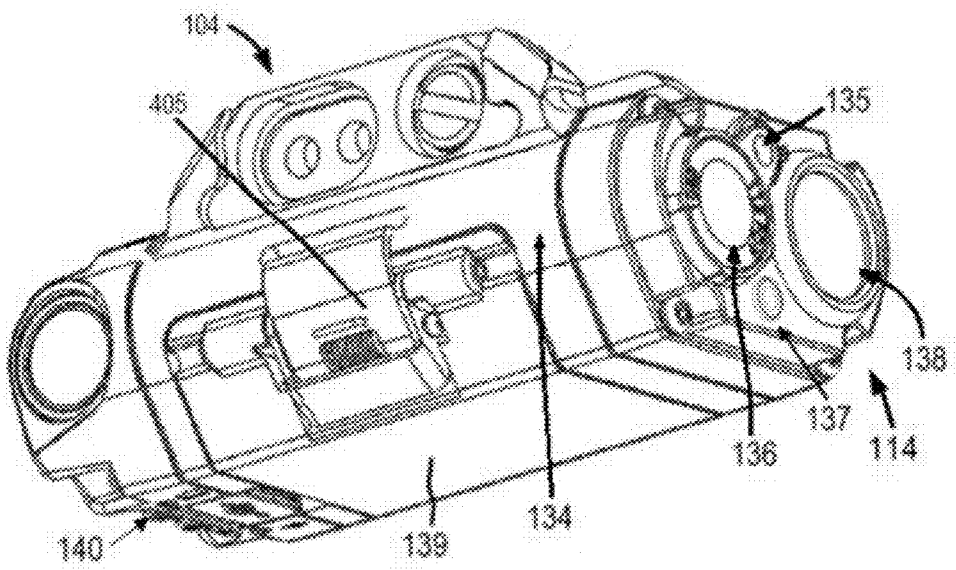
FIG. 2B depicts a bottom perspective view of a recording device and rail set attached thereto, according to one or more embodiments of the disclosure

Referring to FIGS. 1 and 2A-2B, a view of a handgun 102 with a recording device 104 attached thereto and views of the recording device 104 detached from the handgun are depicted, according to one or more embodiments of the disclosure. Additionally, referring to FIGS. 3A-3E and 4A-4D, a view of the recording device with the power source unit removed and views of removed power source units are depicted, according to one or more embodiments.

In one or more embodiments, the handgun 102 includes, among other elements and features, a barrel 106 and a trigger guard 108. In embodiments, the barrel 106 includes a rail system 110 that is configured to accommodate a variety of different accessories and attachments, including the ability to attach the recording device 104 to the rail system 110. Additionally, or alternatively, the handgun 102 may include other attachment points to which the recording device 104 can be attached, for example, a trigger guard mount, a grip mount and/or other attachment points on the handgun 102. While a handgun is depicted in FIG. 1, the recording devices 104 described herein may be used with a variety of different gun styles and sizes, including handguns, rifles, shotguns and/or the like, as well as other devices not considered guns, but that shoot projectiles. For example, recording device 104 could be implemented with non-lethal equipment, such as those that shoot electrical contacts. As such, the handgun 102 depicted in FIG. 1 is meant for illustrative purposes and not meant to be limiting.

As shown, the recording device 104 may be secured to the rail system 110 ahead of the trigger guard 108. While the recording device 104 is shown as attached to the rail system 110, the recording device 104 may be attached to other attachment points on the handgun 102 including, for example, a trigger guard mount, a grip mount and/or like. In embodiments the recording device 104 is configured to record one or more of a video aspect and an audio aspect. As such, in various embodiments the recording device 104 includes a camera 136 and/or a microphone 135 disposed on an end 114 of the recording device 104. The camera 136 and/or microphone 135 disposed on the end 114 of the recording device 104 may be forward facing along a longitudinal axis 116 of the barrel 106 to sense and record video and/or audio that is in front of the handgun 102.

In embodiments, the camera 136 and/or microphone on the end 114 of the recording device 104 may be configured to sense and record video and/or audio that is 1 foot, 5 feet, 10 feet, 25 feet, 50 feet, 100 feet and/or the like in front of the handgun 102. In embodiments, the camera 136 on the end 114 of the recording device 104 may have a fixed focal length or include an autofocus to focus. Additionally, or alternatively, the camera 136 may include more than one camera. For example, multiple cameras may be used to record multiple views (e.g., a view of the user of the handgun 102, a view of what the user is pointing the handgun 102, side views, and/or the like). Additionally, or alternatively, the multiple cameras may be configured to: record a non-zoomed-in view and a zoomed-in view and/or have different focal lengths, at different frames per second, at different resolutions, and/or the like.

Referring to FIGS. 2A-2B a top perspective view and a bottom perspective view of the recording device is depicted, according to one or more embodiments. In the embodiment shown, the recording device 104 includes a rail set 130A, 130B. In various embodiments, the rail set 130A, 130B may include several different mounting apertures 132 to accommodate handguns 102 having different positions for the horizontal cross slot 128. As such, it will be appreciated that the recording device 104 may be attached to a variety of different guns or handguns 102 without requiring alteration of the recording device 104. Further details of embodiments of mounting devices for a gun are disclosed in, for example, U.S. patent application Ser. No. 14/583,342, entitled "Gun Holster and Electronic Assembly" and published as U.S. Pat. Publication 20150184978, which is hereby incorporated by reference in its entirety. Additionally, or alternatively, the recording device 104 may be mounted to the handgun 102 via other methods, such using a trigger guard mount and/or a grip mount. This recording device 104 could be integrated into the gun.

The recording device 104 may include a recording module 134 configured to record one or more of the following: a visual aspect, an audio aspect, a motion aspect of the gun, a temperature aspect, a pressure aspect, date, time and/or location of the recording device 104. In embodiments, the recording module 134 may begin or cease recording in response to one or more signals, as described in more detail below. In embodiments where the recording module 134 is configured to record a visual aspect, the recording module 134 may be a video camera with a lens 136 disposed on an end 114 of the recording device 104. In embodiments, the recording module 134 may be configured to focus at different distances, record at different frames per second, record at different resolutions, and/or the like. To capture video in low light, the recording device 104 may include a light-emitting diode 138 (LED) (or other type of lighting device) that is capable of illuminating areas in front of the recording device 104. Additionally, or alternatively, the video camera 136 may be configured to capture video in low light with or without the use of the LED 138. Additionally, or alternatively, the recording device 104 may be configured to include a time stamp on any recordings. The time stamp may indicate a local time that the recording was recorded.

Additionally, or alternatively, the recording device 104 may include a laser 137 that facilitates aiming of a gun (or other device configured to shoot a projectile) to which the recording device 104 is attached. In embodiments, the recording device 104 may include a green, red, blue and/or other color laser sight(s) for determining where the handgun 102 and/or the recording device 104 are pointed. An example of a green laser light that may be incorporated into the recording device 104 is disclosed in U.S. Pat. No. 9,658,031, entitled "Auto On Green Laser Sight," which is hereby incorporated by reference in its entirety.

Additionally or alternatively, the recording device 104 may include a microphone for recording an audio aspect, a temperature sensor for sensing a temperature of the environment of the recording device 104, a pressure sensor for sensing a pressure of the environment of the recording device 104, one or more motion sensors (e.g., gyroscopes, accelerometers and/or the like) for sensing motion of the recording device 104, one or more sensors for measuring times and/or dates, one or more sensors for recording biometric indicators, and/or one or more location sensors (e.g., a GPS receiver) for measuring the location of the recording device 104. In embodiments, the pressure sensor for sensing pressure of the environment of the recording device 104 may be a different than the pressure sensor used for determining whether the handgun 102 is deployed or un-deployed.

To power the recording device 104, the recording device 104 includes an onboard power source, such as power source unit 139. In embodiments, the power source unit 139 may be replaceable, rechargeable and/or removable. In one or more embodiments, the power source unit 139 may include a plurality of electrical contacts 418, 618, for power and data transmission between the power source unit 139 and the recording unit 141 via the mating electrical contacts 415, 515, of the recording unit 141, and between the power source unit 139 and a docking station or power and/or data transfer node. In embodiments, the power source unit 139 may be a customized power source unit 139 and may include spring contacts accommodating removal of the power source unit 139.

In one or more embodiments, the power source unit 139 is configured to be detachable from the recording unit 141 of the recording device 104, which includes the recording module 134, allowing the recording unit 141 containing the recording module 134 to remain mounted, secured and/or positioned in its desired location (for example, mounted to the gun 102) in the event the power source unit 139 needs to be removed to be recharged. As such, the sighting of the recording module 134 does not have to be recalibrated each time the power source unit 139 needs to be removed and/or recharged.

Figure 3A:
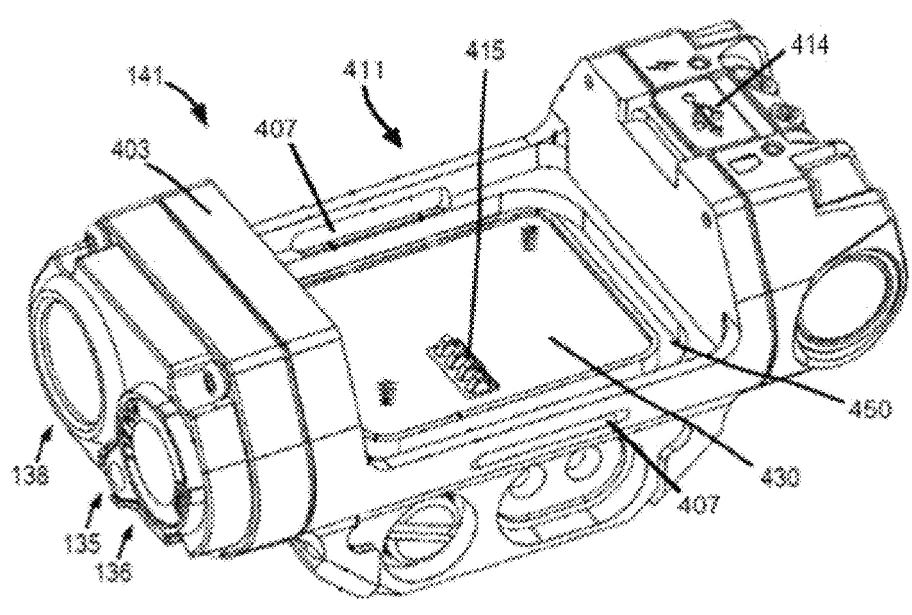
FIG. 3A depicts a top perspective view of the recording device with the power source unit removed, according to one or more embodiments of the disclosure.
Figure 3B:
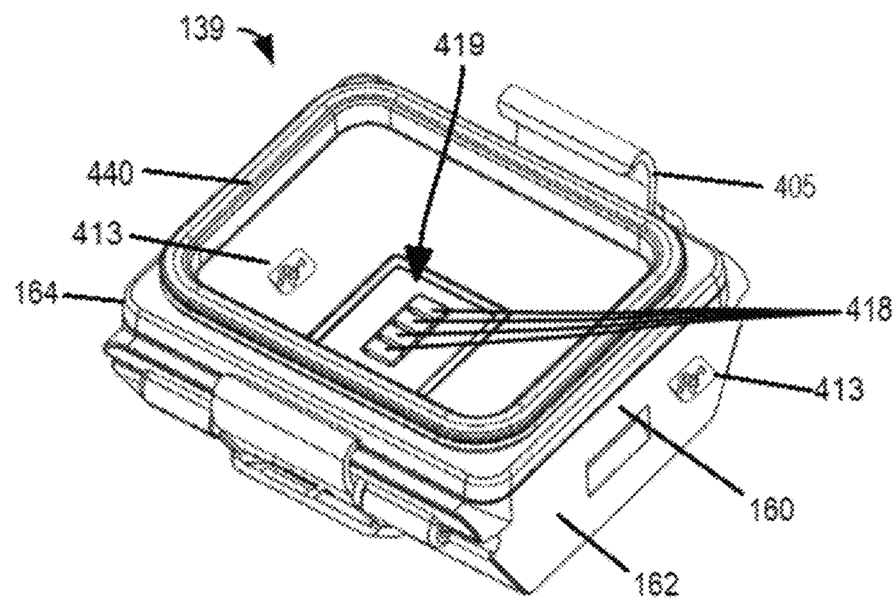
FIG. 3B depicts a top perspective view of the power source unit, according to one or more embodiments of the disclosure.

Referring to FIGS. 3A-3B, a recording unit 141 without the power source unit 139 coupled thereto, and a power source unit 139 decoupled from the recording unit 141 are depicted, respectively, according to one or more embodiments of the disclosure. In embodiments, recording unit 141 includes a housing 403, wherein, in one or more embodiments, the housing 403 is configured to be mounted to the gun 102. The housing 403 defines a power source receptacle 411 configured to receive the power source unit 139 during coupling of the power source unit 139 to the recording unit 141. Housing 403 may include a backing 430 configured to engage and/or support the power source unit 139, such as when the power source unit 139 is coupled to the housing 403. The recording unit 141 may further include internal spring components between the recording unit 141 and the power source unit 139.

In one or more embodiments, power source unit 139 includes a battery power supply 422, which may be a rechargeable power supply (e.g., a rechargeable battery). In one or more embodiments, the power source unit 139 includes a housing 160 or battery pack, including a lower housing 162 and a housing cover 164. Lower housing 162 defines a receptacle 166 for receiving and containing the battery power supply 422 and, in one or more embodiments, a circuit board for battery management. In one or more embodiments, the power source unit 139 further includes a coupler 405 configured to be coupled (e.g., removably) to a coupler 407 of the housing 403, to secure the power source unit 139 to the housing 403 of the recording unit 141. In one or more embodiments, coupler 405 includes a clip (e.g., a butterfly clasp) configured to engage coupler 407, which may comprise a recess or slot. In one or more embodiments, the coupler 405 of the power source unit 139 includes a plurality of couplers (see FIG. 3B). Similarly, the coupler 407 of the housing 403 may include a plurality of couplers (see FIG. 3A). In various embodiments, the housing 403 is configured to be mounted to the gun 102.

Figure 3C:
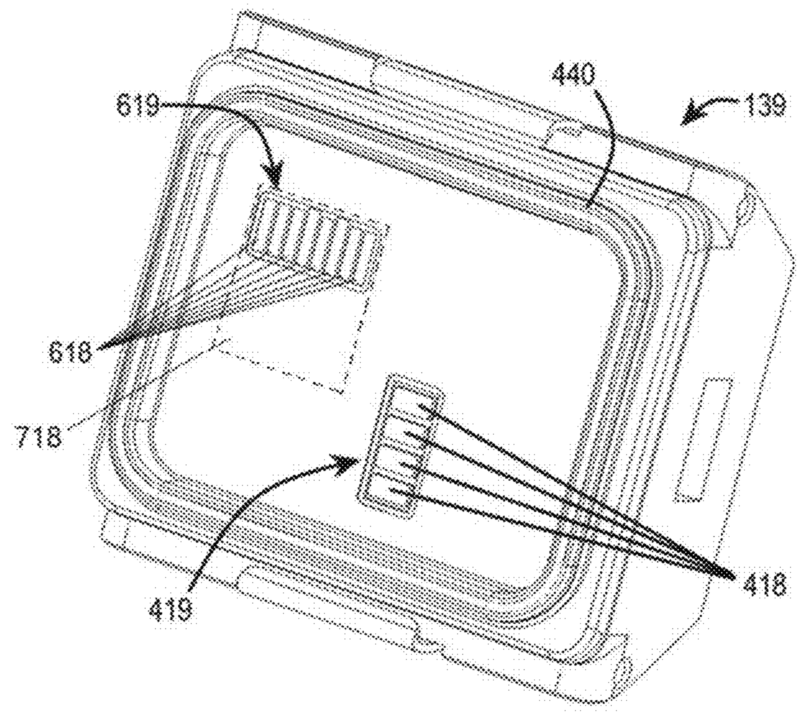
FIG. 3C depicts a top perspective view of a power source unit, according to one or more embodiments of the disclosure.
Figure 3D:
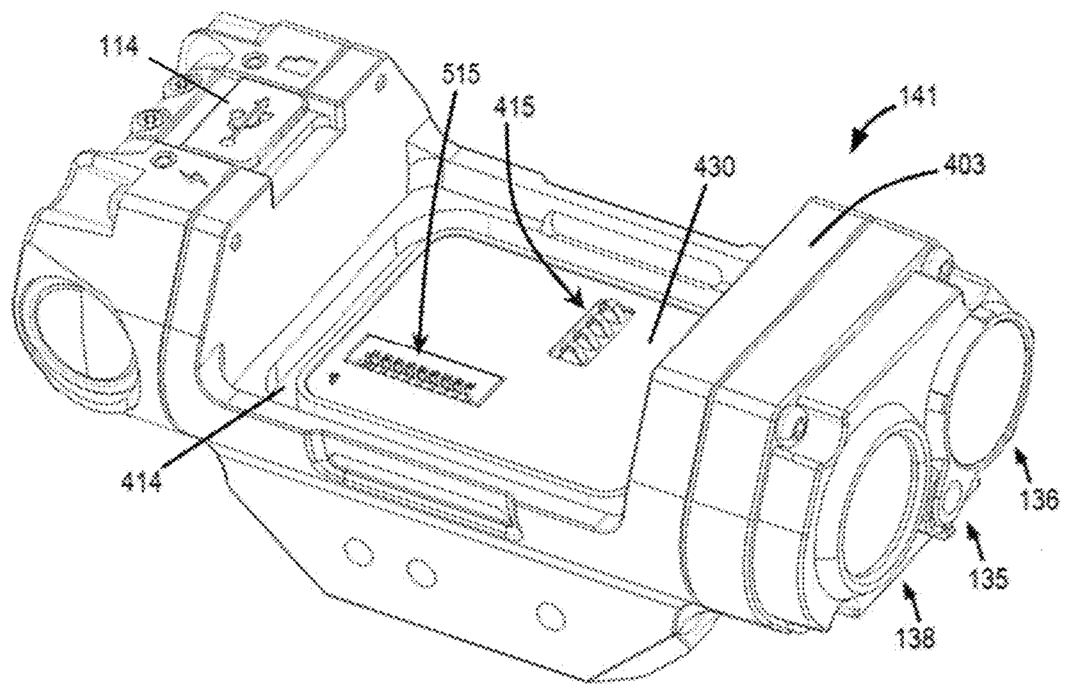
FIG. 3D depicts a top perspective view of a recording device with the power source unit removed, according to one or more embodiments of the disclosure.
Figure 3E:
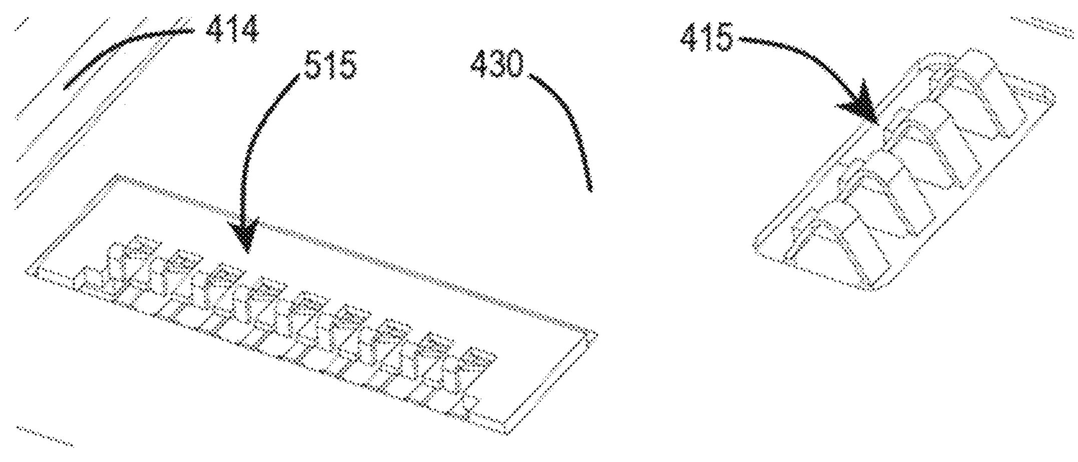
FIG. 3E depicts a perspective view of electrical contacts of the recording devices of FIG. 3D, according to one or more embodiments of the disclosure.

Referring to FIGS. 3C-3E, in one or more embodiments, the power source unit 139 may further include a second set of electronic contacts 618 including data contacts 619, which may be connected to the memory or SD card 718. The second set of electronic contacts 618 may be configured to matingly engage a second set of electrical contacts 515 including data contacts correspondingly configured on the recording unit 141.

In one or more embodiments, electrical contacts 418 and 618 may each include data transfer contacts and power transfer contacts and electrical contacts 415 and 515 may each include data transfer contacts and power transfer contacts. In one or more embodiments, electrical contacts 418 and corresponding electrical contacts 415 include power transfer contacts for transfer of power between the power source unit 139 and the recording unit 141 and for the recharging of the power source unit when coupled to a docking station or device; and electrical contacts 618 and corresponding electrical contacts 515 include data transfer contacts for transfer of data between the power source unit 139 and the recording unit 141 and between the memory 424 of the power source unit 139 and a server device when coupled to a docking station or device. The docking station or device would include corresponding electrical contacts for mating engagement with the electrical data and power contacts of the power source unit 139. An embodiment of a docking station/device is illustrated in FIGS. 9A-9D. The docking station/device is configured for recharging the power source unit 339 and data transfer and communication with the memory within the power source unit.

An embodiment of the electrical contacts 415, 515, of the recording unit 141 are illustrated in FIG. 3E. In one or more embodiments, the electrical contacts are electrical spring contacts.

Figure 4A:
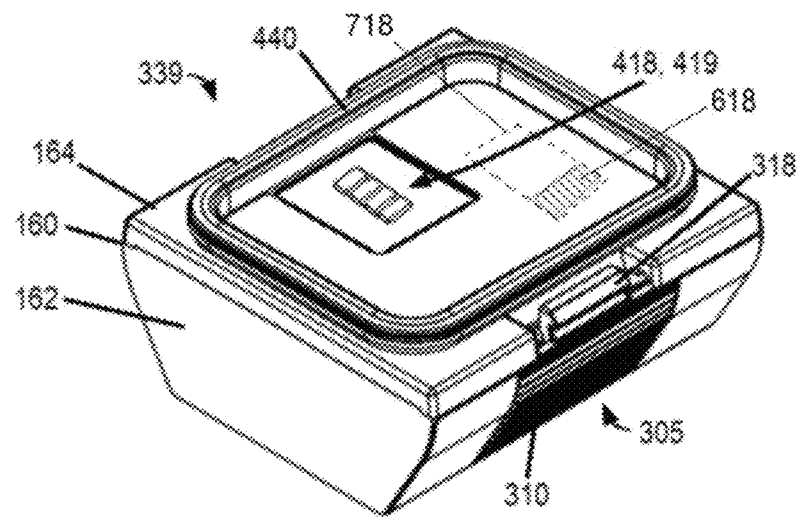
FIG. 4A depicts a top perspective view of a power source unit, according to one or more embodiments of the disclosure.
Figure 4B:
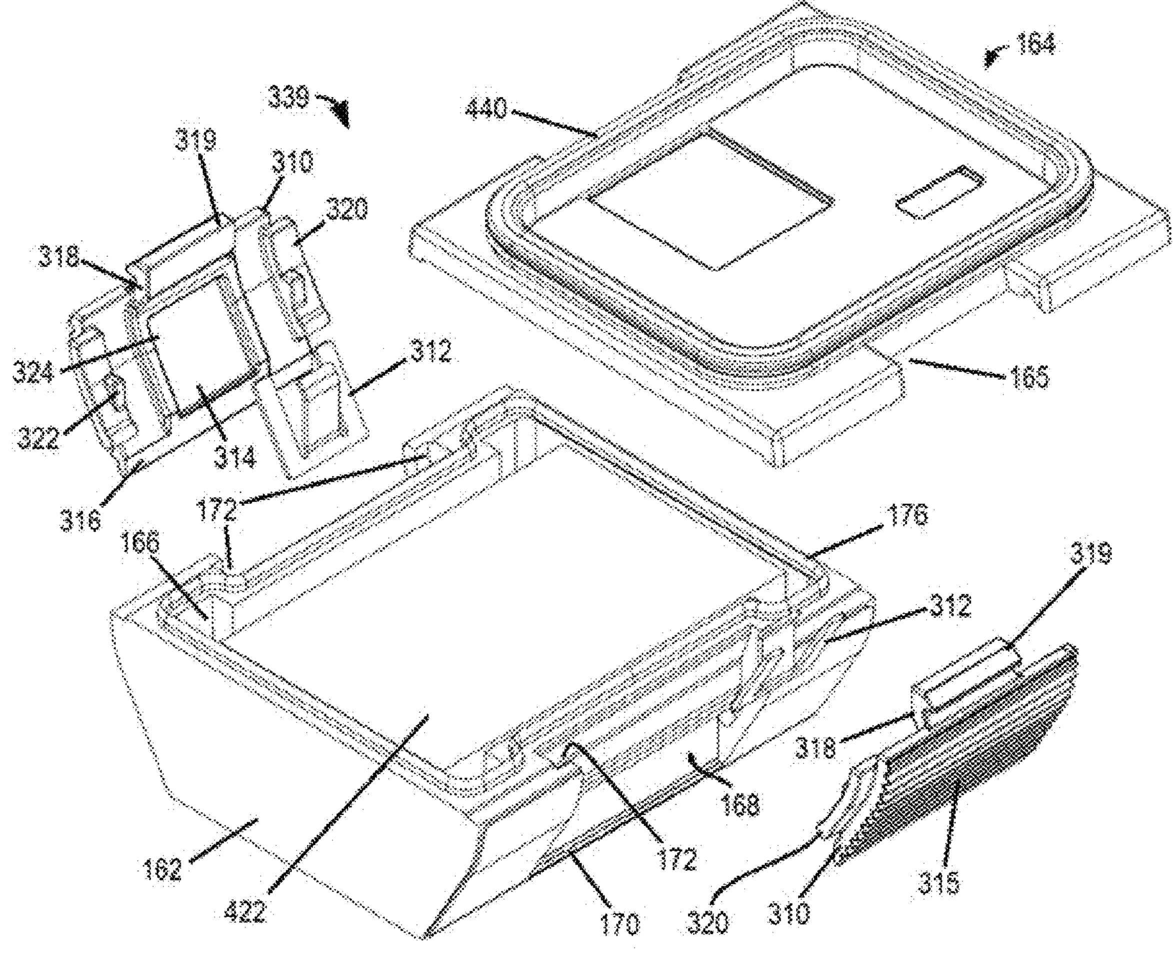
FIG. 4B depicts a top perspective exploded view of the power source unit of FIG. 4A, according to one or more embodiments of the disclosure.
Figure 4C:
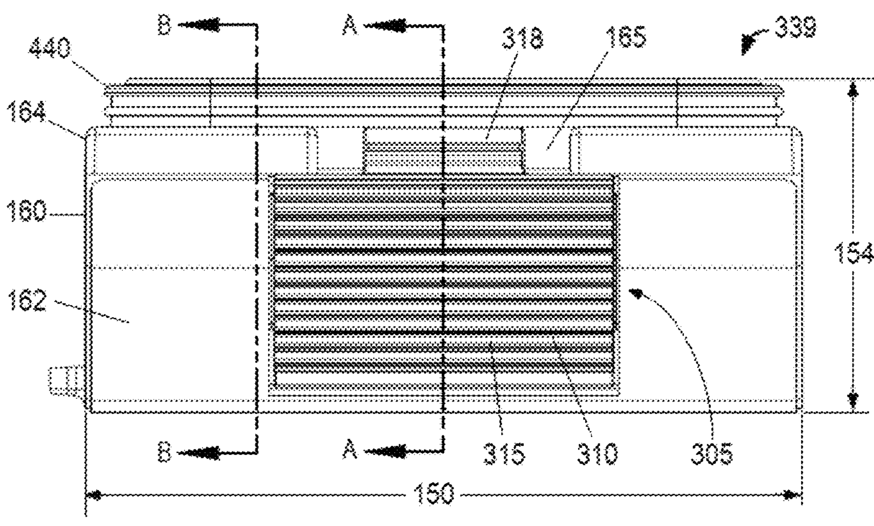
FIG. 4C depicts a side view of the power source unit of FIGS. 4A-4B, according to one or more embodiments of the disclosure.
Figure 4D:
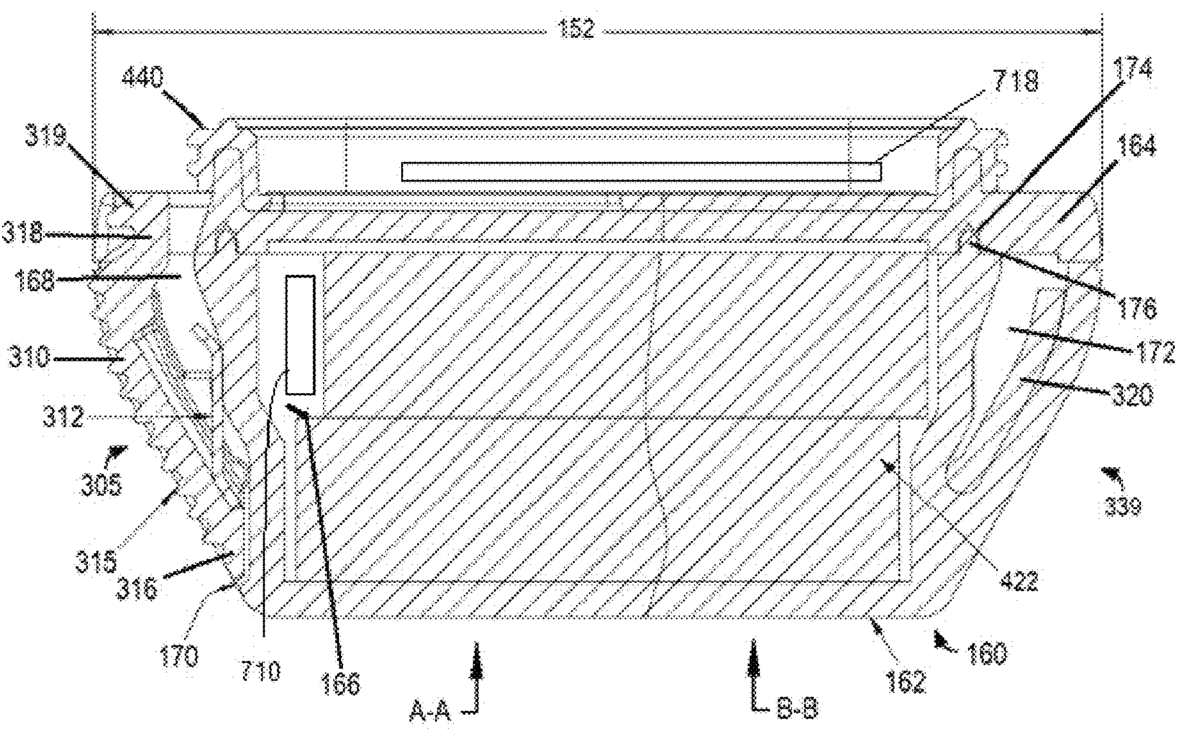
FIG. 4D depicts a cross-sectional view of the power source unit of FIG. 4C at lines A-A and B-B, according to one or more embodiments of the disclosure.

Referring to FIGS. 4A-4D, a top perspective view, an exploded view, a side view and a cross-sectional view at lines A-A and B-B of FIG. 4C of a power source unit 339 decoupled from the recording unit 141 is depicted, according to one or more embodiments of the present disclosure. The power source unit 339 includes a battery power supply 422, which may be a rechargeable power supply (e.g., a rechargeable battery). In embodiments, the power source unit 339 is configured to be detachable from the recording unit 141, allowing the recording unit 141 containing the recording module 134 to remain mounted, secured and/or positioned in its desired location (for example, mounted to the gun 102) in the event the power source unit 339 needs to be removed to be recharged or for data transfer.

In one or more embodiments, the power source unit 339 includes a housing 160 or battery pack, including a lower housing 162 and a housing cover 164. Lower housing 162 defines a receptacle 166 for receiving and containing the battery power supply 422. In one or more embodiments, the power source unit 339 may further include at least one locking mechanism 305 configured to couple (e.g., removably) to the an engagement portion 407 of the housing 403, to secure the power source unit 339 to the housing 403 of the recording unit 141.

In one or more embodiments, locking mechanism 305 includes a push button assembly that engages housing 403, securing the power source unit 339 to the recording unit 141, and, when activated by pressing inward, facilitates a decoupling or release from engagement portion 407, allowing removal of the power source unit 339 from the recording unit 141. In one or more embodiments, the push button assembly includes a rigid push button member 310 and a resilient biasing portion 312 positioned in a side receptacle portion 168 of the lower housing 162, between the push button member 310 and the lower housing 162. In embodiments, the resilient biasing portion 312 engages an inner surface 314 of the push button member 310, biasing the push button member 310 away from the lower housing 162 and into an engagement position, such that inward pressure on an outer activation surface 315 of the push button member 310 effectuates increased deflection of the resilient biasing portion 312.

In one or more embodiments, push button member 310 includes a base portion 316 positioned in a lower inset portion 170 of a side receptacle 168 of the lower housing 162, an outer button surface 315 and an engagement portion 318, which may extend upward in one or more slotted portion(s) 165 of the housing cover 164. In embodiments, push button member 310 may be mounted and configured to pivot or hinge at base portion 316 in the lower inset portion 170 of side receptacle 168. In one or more embodiments, engagement portion 318 includes a male fastener portion 319 configured to engage female engagement portion 407 of the recording unit 141. In embodiments, male fastener portion 319 may include a catch, latch or hook portion. In one or embodiments, portion 319 is a molded undercut configured to engage a mating lip, recess or slot 407 of the housing 403 of the recording unit 141. In an alternative embodiment, engagement portion 318 includes a female engagement portion, such as a tab or extension having a recess or slot, and engagement portion 407 includes a male engagement portion, such as a catch, latch or hook portion configured to engage portion 318.

In one or more embodiments, the resilient biasing portion 312, which may be at least partially deflected in a resting state of the locking mechanism 305, provides the force required to keep engagement portion 318 of the locking mechanism 305 in place when coupled to the housing 403 of the recording unit 141. Inward pressure on the push button member 310 of the locking mechanism 305 that is coupled to a recording unit 141 causes engagement portion 318 to move from an engagement position to a release position, thereby releasing the locking mechanism 305 from the engagement portion 407 of the housing 403 of the recording unit 141, allowing for decoupling and removal of the power source unit 339.

In one or more embodiments, push button member 310 may further include one or more side tab portions 320 or side wings that extend into corresponding side channels 172 in the side receptacle 168 of the lower housing 162. In embodiments, side channels 172 may be configured to limit the range of motion of the push button member 310 during operation of the locking mechanism 305. In embodiments, side tab portions 320 may further include spacer portions 322, as shown in FIG. 4B.

In one or more embodiments, push button member 310 may include an inset portion 324 in the inner surface 314 of the push button member 310, as shown in FIG. 4B. Inset portion 324 may be configured to receive the resilient biasing portion 312. In one or more embodiments, resilient biasing portion 312 is a spring, and, in an embodiment, a flat spring. However, embodiments are not limited to the resilient biasing portion shown and other types of load bearing devices, structures and/or mechanisms are contemplated herein. In one or more embodiments, outer activation surface of push button member 310 is textured and, in one or more embodiments, ribbed.

In some examples, the locking mechanism 305 of the power source unit 339 includes a plurality of locking mechanisms 305 (see FIG. 4B). Similarly, the engagement portion 407 of the housing 403 may include a plurality of corresponding engagement portions (see FIG. 3A).

In one or more embodiments, housing cover 164 defines one or more channels or recesses 174 configured to receive and engage an engagement portion or member 176 of the lower housing 162 of the power source unit 139, 339, to form an engagement or seal. In an embodiment, engagement portion or member 176 of lower housing 162 is configured to engage the channel(s) or recess(es) 174 of the housing cover 164 to form the seal and prevent debris and/or liquid from entering the housing receptacle 166 of the power source unit 139, 339. In one or more embodiments, the engagement is a press fit engagement, and, in an embodiment, the engagement may be a snap fit engagement. In embodiments, the seal may be a hermetic seal, and, in embodiments, may be a watertight seal. In embodiments, engagement portion or member 176 may be formed of or comprise a polymer and/or elastomeric material. In an alternative embodiment, one or more channels or recesses are defined by the lower housing 162 of the power source unit 139, 339, and configured to engage an engagement portion or member of the housing cover to form the engagement.

In one or more embodiments, the housing 403 of the recording unit 141 defines one or more recesses 450 configured to engage a sealing portion or member 440 of the power source unit 139, 339 to form a seal, such as to prevent dust or debris to enter. In embodiments, the seal may be a hermetic seal, and, in embodiments, may be a watertight seal. In an embodiment, sealing portion or member 440 is configured to engage the recess(es) 450 of housing 403 to form the seal and prevent debris and/or liquid from entering between the power source unit 139, 339 and the housing 403 when the power source unit 139, 339 is coupled to the housing 403. In embodiments, sealing portion or member 440 may be formed of or comprise a polymer and/or elastomeric material. In an alternative embodiment, one or more recesses are defined by the power source unit 139, 339 and configured to engage a sealing portion or member of the housing 403 to form the seal.

In embodiments, where the power source unit is rechargeable, the power source unit 139, 339, and may include electrical contacts 418 configured to electrically connect and supply power to the recording device and to electrically connect with an external power supply for recharging when decoupled from the recording unit 141. In one or more embodiments, the power source unit 139, 339 may be recharged via a wire (e.g., via a power cord coupled to the recording device 104 and/or the power source unit 139, 339) and/or may be recharged wirelessly, (e.g., inductively or capacitively). In one or more embodiments, the power source unit 139, 339 does not need to be removed from the recording unit 141 and may include contactless connectors for power and data transmission.

Although not shown or specifically referenced, in embodiments of the current disclosure, power source unit 339 may include features, abilities, hardware and/or software components disclosed herein in reference to power source unit 139.

Additionally, or alternatively, the power source unit 139 may be removable and coupled with a docking station to recharge the power source unit 139 and/or transfer data from the memory of the power source unit 139. Described further below, in various embodiments the power source unit 139 can additionally include memory. In such embodiments, the power source unit 139 can function as both a battery for powering operation of the recording device 104 and as a data store for information collected by the device 104. Furthermore, in various embodiments the memory allows for data redundancy in the recording device 104. Similarly, in various embodiments the memory of the power source unit 139 allows for easy data transfer from the recording device 104 to an external storage system. For example, in one or more embodiments, one or more charging nodes or docking stations can be configured to automatically download and/or transfer stored information from the memory to a more permanent database. In such a manner data transfer from the recording device 104 can be accomplished easily in the regular and required process of recharging the power source unit 139, obviating any requirements for removal of the recording device 104 from the gun 102 or other more complicated processes for transferring saved data.

In embodiments, the recording device 104 may also include an indicator 140 disposed on the, bottom, left side and/or right side of the recording device 104. The indicator 140 may indicate the remaining amount of power of the power source unit 139 and/or how much memory is left for recording video, sound, etc. Additionally, or alternatively, the indicator 140 may indicate whether the recording device 104 is recording. In embodiments, the recording device 104 may include two modes: one mode where a user cannot modify one or more settings of the recording device 104 (e.g., when the recording device 104 records) and another mode where a user can modify one or more of the settings of the recording device 104. In the embodiments where a user cannot modify one or more settings of the recording device 104, one or more settings of the recording device 104 may only be modified by an administrator. Additionally, or alternatively, while a user may not be able to modify one or more settings, the user may be able to view and/or listen to the recordings but may not be able to modify the recordings.

In embodiments, the recording device 104 may include one or more user interface buttons 142 disposed on the left side and/or right side of the recording device 104. A user interface button 142 may provide a user and/or administrator, depending on the mode of the recording device 104, with the ability to program and/or modify the functionality of the recording device 104. For example, the user interface button 142 may provide an administrator the ability to determine when and how the recording device 104 records, how long the recording device 104 records and/or the like. Additionally, or alternatively, the user interface button 142 may control the operation of the LED 138 and/or other functions included in the recording device (e.g., a microphone, a temperature sensor, a pressure sensor, audio sensor, biometric sensor, and/or a laser gun sight). In some embodiments, some functions of the user interface button 142 may be controllable by a non-administrator while others may only be controllable by an administrator. For example, recording aspects of the recording device 104 (e.g., when and how long the recording device 104 records) may only be controllable by an administrator while a non-administrator may be able to control a laser and/or light of the recording device 104. In some embodiments, the interface button 142 may be replaced by a touchscreen or other user interface. In some embodiments, before being able to modify one or more settings of the recording device 104, a specific code and/or other authorizing indicia (e.g., a biometric identifier) may need to be entered into the user interface button 142 before the user has the ability to modify the functionality of the recording device 104. This may prevent some users from controlling the settings of the recording device 104, while still allowing other users (e.g., administrators) to have access to the settings of the recording device 104. Additionally, or alternatively, some functions of the interface button 142 may be replaced and/or replicated by an application on a smartphone.

As such, in at least some embodiments, the power source unit 139 includes a plurality of electrical contacts 418, which may include electrical contacts configured to be electrically coupled to the battery 424 within the power source unit 139, 339 for supply of power to the recording device unit 141 when the power source unit 139 is coupled to the recording unit 141 and for recharging the battery when the power source unit 139 is electronically engaged with a charging node or a docking station, for example charging nodes 512, 514, 516 and docking station 517.

In embodiments, recording unit 141 includes a plurality of electrical contacts 415 corresponding to the electrical contacts 418 of the power source unit 139. The electrical contacts 415 may include electrical contacts configured for power transfer to the electronic components within the recording unit 141 when the recording unit 141 is coupled to the power source unit 139. In embodiments, the coupling may also facilitate recharging of an optional internal battery electrically coupled to the electrical contacts 415.

In addition, the electrical contacts 418 can include one or more additional data contacts 419 configured to transfer data to and from the power source unit 139.

In addition, the electrical contacts 418 of the power source unit 139 may further include one or more data contacts 419 communicatively connected to the memory 424 within the power source unit 139 and configured to transfer data to and from the power source unit 139. In embodiments, the electrical contacts 415 of the recording unit may also further include one or more data contacts communicatively connected to memory, recording and data modules and electronic components within the recording unit 141 and configured to transfer data to and from the recording unit 141.

The data contacts of the power source unit 139 and the recording unit 141 may be matingly configured for data transmission between the power source unit 139 and the recording unit 141 when the contacts are coupled.

In embodiments, the data contacts 419 of the power source unit 139 may be further configured and adapted to communicatively connect with a server for networking with the memory 424 of the power source unit 139. In an embodiment, the data contacts 419 are configured for a docking engagement with an external device and transmission of data and/or control signals between the power source unit memory 424 and the server device. In embodiments, the data contacts 419 may be configured to communicationally engaged with a docking station or device for transmission of data to and from the memory 424 within the power source unit 139. As noted, engagement with the docking station or device may also be adapted for recharging of the battery of the power source unit 139.

3E-3G, in one or more embodiments, the power source unit 139 may further include a second set of electronic contacts 618 including data contacts 619, The second set of electronic contacts 618 may be configured to matingly engage a second set of electrical contacts 515 including data contacts correspondingly configured on the recording unit 141.

In one or more embodiments, electrical contacts 418 and 618 may each include data transfer contacts and power transfer contacts and electrical contacts 415 and 515 may each include data transfer contacts and power transfer contacts. In one or more embodiments, electrical contacts 418 and corresponding electrical contacts 415 include power transfer contacts for transfer of power between the power source unit 139 and the recording unit 141 and for the recharging of the power source unit when coupled to a docking station or device; and electrical contacts 618 and corresponding electrical contacts 515 include data transfer contacts for transfer of data between the power source unit 139 and the recording unit 141 and between the memory 424 of the power source unit 139 and a server device when coupled to a docking station or device. The docking station or device would include corresponding electrical contacts for mating engagement with the electrical data and power contacts of the power source unit 139.

An embodiment of the electrical contacts 415, 515, of the recording unit 141 are illustrated in FIG. 3G. In one or more embodiments, the electrical contacts are electrical spring contacts.

The recording device 104 may also include a processing device 144. The processing device 144 may control the functionality of the recording device 104, as described below. Additionally, in embodiments, the recording device 104 may include memory (not shown) to store any data recorded by the recording device 104.

Figure 5:
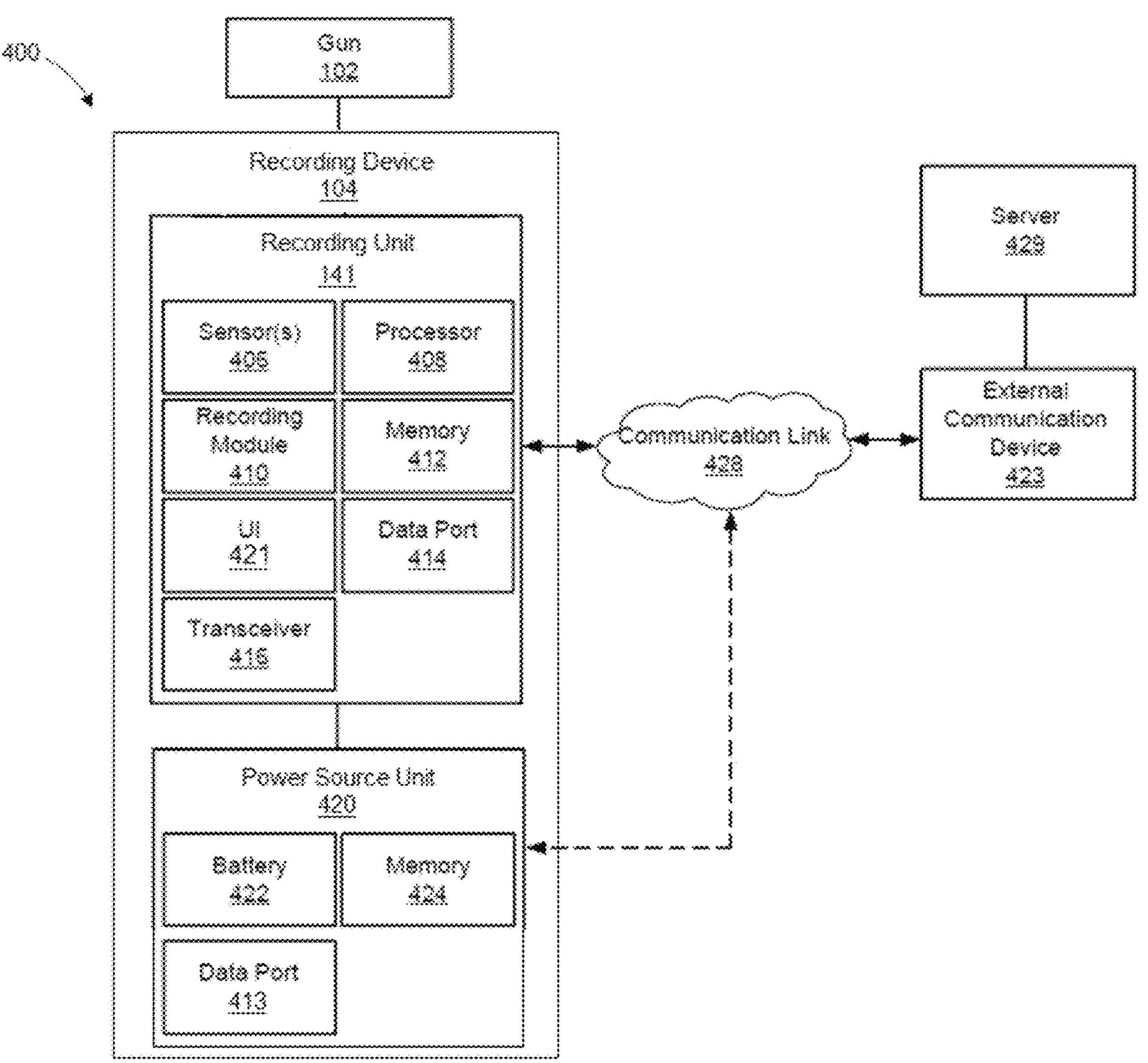
FIG. 5 is a block diagram of an embodiment of a system including a gun and a recording device, according to one or more embodiments of the disclosure.

For example, FIG. 5 is a block diagram of an embodiment of a system 400 including a gun 102 and the recording device 104 mounted thereto, in accordance with embodiments of the present disclosure. In embodiments, the recording device 104 may include one or more of the following components: one or more sensors 406, a processing device 408, a recording module 410, memory 412, a data port 414, a transceiver 416, and/or a user interface 421. In various embodiments, the recording device 104 additionally includes a power source unit 420 (139, 339) removable from a recording unit 141.

As described, in various embodiments of the removable power source unit 420 (including power source units 139, 339) can include a battery 422 for providing power to the recording device 104 while attached thereto and memory 424. In embodiments, the power source unit 420 may separately include a data port 413 and a transceiver for transfer of data. While the above components are depicted as being included in the recording device 104, one or more of the components may be located external to the recording device 104 or removably attachable to the device, such as the power source unit 420. The present disclosure further contemplates one or more embodiments, wherein a remotely located external device may access the recording device, recording unit 141 and/or power source unit 139, 420, to download and/or access recorded data, and, in one or more embodiments, in real-time or near real-time.

In embodiments, the sensor(s) 406 may be configured to sense a signal that corresponds to the gun 102 being deployed. As indicated above, to be deployed, the gun 102 does not have to be fired. Instead, the gun 102 may be deployed if it is withdrawn from a holster and/or safe, picked up from a surface (e.g., a nightstand drawer, automobile glove box and/or the like), activated via an audio command, activated via a biometric indicator, moved in such a way that would indicate that a user is using the gun 202, such as pointing the gun 202 at a target, in the vicinity of a target, moving the gun in a defensive manner and/or for an expected engagement, and/or in a direction in which the user believes there to be a target.

The processing device 408 may be any arrangement of electronic circuits, electronic components, processors, program components and/or the like configured to store and/or execute programming instructions, to direct the operation of the other functional components of the recording device 104 and may be implemented, for example, in the form of any combination of hardware, software, and/or firmware. The recording module 410 for example is a collection of software instructions that cause the recording device 104 to record video and/or audio aspects using the elements of the device 104. In embodiments, the recordings of the recording module 410 may be saved in one or both of memory 412 and 424. The saved recordings may be password protected, encrypted, access limited (e.g., only an authorized user such as an administrator may have access to the saved recordings on memory 412), and/or the like. In embodiments, if the memory is full the recordings may loop and save over the earliest saved recordings in memory. In embodiments, segmenting the recordings into multiple files may facilitate reducing the amount of recordings that are recorded over in comparison to embodiments where the recordings are saved as one file. In embodiments, saving over the earliest saved recordings in memory may be disabled, so that once memory is full, the recording stops saving to memory and, in embodiments, only transmits the data via a communication link 428 to an external communication device 423 and/or external server 429.

In embodiments, the memory 412 includes computer-readable media in the form of volatile and/or nonvolatile memory and may be removable, nonremovable, or a combination thereof. Media examples include Random Access Memory (RAM); Read Only Memory (ROM); Electronically Erasable Programmable Read Only Memory (EEPROM); flash memory; optical or holographic media; magnetic cassettes, magnetic tape, magnetic disk storage or other magnetic storage devices; data transmissions; and/or any other medium that can be used to store information and can be accessed by a computing device such as, for example, quantum state memory, and/or the like, including memory that may be compatible with existing law enforcement and/or other data management system.

In embodiments, the recordings may be transmitted to an external communication device 423 via a network or communication link 428 where the recordings can be saved on a server 429. In embodiments, recordings may also be transferred from the recording device 104, including the recording unit 141 and or the power source unit 139, 420, to the server 429 via a wireless or wired connection (e.g., via the data port 414 or transceiver 416). In embodiments, the data management of the recording device 104 may be compatible with existing law enforcement data management systems and requirements. Additionally, or alternatively, the transmission may be encrypted via public-key encryption methods and/or other types of encryption.

In embodiments, the recordings may be transmitted to the server 429 at a specified time interval and/or upon demand. Additionally, or alternatively, the recordings may be transmitted to the server 429 when a designated amount of space on the memory 412 or 424 has been used. For example, when 70%, 80%, 90%, and/or 100% of the memory has been used, the recordings may be transmitted to the server 429. Additionally, or alternatively, the recordings may be transmitted to the server 429 upon certain conditions occurring (e.g., the gun 102 being fired and/or a law enforcement officer returning to the station at which he/she works).

In embodiments, the communication link 428 may be, or include, a wireless communication link such as, for example, a short-range radio link, such as Bluetooth, IEEE 802.11, cellular, a proprietary wireless protocol, and/or the like. In embodiments, for example, the communication link 428 may utilize Bluetooth Low Energy radio (Bluetooth 4.1), or a similar protocol, and may utilize an operating frequency in the range of 2.40 to 2.48 GHz. The term "communication link" may refer to an ability to communicate some type of information in at least one direction between at least two devices and should not be understood to be limited to a direct, persistent, or otherwise limited communication channel. That is, according to embodiments, the communication link 428 may be a persistent communication link, an intermittent communication link, an ad-hoc communication link, and/or the like. The communication link 428 may refer to direct communications between the recording device 104 and the external communication device 423, and/or indirect communications that travel between the recording device 104 and the external communication device 423 via at least one other device (e.g., a repeater, router, hub, and/or the like). The communication link 428 may facilitate uni-directional and/or bi-directional communication between the recording device 104 and the external communication device 423. Data and/or control signals may be transmitted between the recording device 104 and the external communication device 423 to coordinate the functions of the recording device 204 and/or the external communication device 423. In embodiments, the communication link 428 may be compatible with existing law enforcement data management systems and requirements.

Additionally, or alternatively, the memory 424 of the power source unit 420 may be connectable with the external communication device 423 via the communication link 428. For example, in various embodiments the power source unit 420 is removable and can be coupled with an external communication device 423 in the form of a data station. In one or more embodiments, the data station is additional configured as a recharge station that recharges the battery 422. In such embodiments, the memory 424 provides for data redundancy in the recording device 104. In such instances, data redundancy allows for reduction or elimination of potential tampering by providing a backup or master copy of all recorded data. In one or more embodiments, the copies can be compared with one another to verify that the data has not been tampered with or corrupted in a manner to prevent access to recorded information. Similarly, data redundancy provides for a reduced chance of data loss from device damage.

In an embodiment, the recording unit 141 and/or the power source unit 420 of the recording device 104 may be communicatively coupled to one or more mobile external communication devices. In one or more embodiments, the one or more mobile external communications devices is an electronic mobile device carried by the person using the recording device 104 or an individual in proximity thereto. The mobile external communications device may be a mobile device that may be carried on the user's person. In one or more embodiments, the mobile external communications device may be a body camera, a cell phone or other wireless data recording and transmission device. In one or more embodiments, recordings from the recording device 104, including the recording unit 141 and or the power source unit 139, 420 may be wirelessly transmitted to the mobile external communication device where the recordings can be saved and stored and/or transmitted. In embodiments, the data management of the recording device 104 and the mobile external communications device may be authorized devices and compatible with existing law enforcement data management systems and requirements. Additionally, or alternatively, the transmission may be encrypted via public-key encryption methods and/or other types of encryption.

In one or more embodiments, recording unit 141 and or the power source unit 139, 420 and the mobile external communication device are may be wirelessly communicatively coupled. The recording device 104 and the mobile external communication device may be synced such that data, recordings, time stamps and ID's are linked and coordinated. In one or embodiments, power and recording modes are connected such that the start of recording by one initiates recording of the other device(s).

In one or more embodiment, the mobile device may wirelessly access and download recorded data from the recording device 104, in one or more embodiments, in real-time or near real-time. In one or more embodiments, the mobile device collects and coordinates the recorded data from the recording device 104 and, in one or more embodiments, the mobile device may be communicatively coupled to multiple recording devices 104 and may collect and coordinate recorded data from multiple recording devices for storage for later access or for transmission to another external communications device and/or server, in one or more embodiments, in real-time or near real-time.

In one or more embodiments, the communication link may facilitate uni-directional and/or bi-directional communication between the recording device(s) 104 and the mobile external communication device. Data and/or control signals may be transmitted between the recording device(s) 104 and the mobile external communication device to coordinate the functions of the recording device(s) 204 and/or the mobile external communication device. In one or more embodiments, the mobile external communications device is a body camera communicatively coupled to a recording device 104, both carried by one person. In one or more embodiments, the mobile external communications device is a body camera communicatively coupled to multiple recording devices 104 carried by multiple individuals. In embodiments, the communication link may be compatible with existing law enforcement data management systems and requirements.

Similarly, in various embodiments the memory of the power source unit 420 allows for easy data transfer from the recording device 104 to an external storage system. For example, in one or more embodiments, one or more charging nodes or docking stations can be configured to automatically download and/or transfer stored information from the memory to a more permanent database. In such a manner data transfer from the recording device 104 can be accomplished easily in the regular and required process of recharging the power source unit 420, obviating any requirements for removal of the recording device 104 from the gun 102 or other more complicated processes for transferring saved data.

Figure 6A:
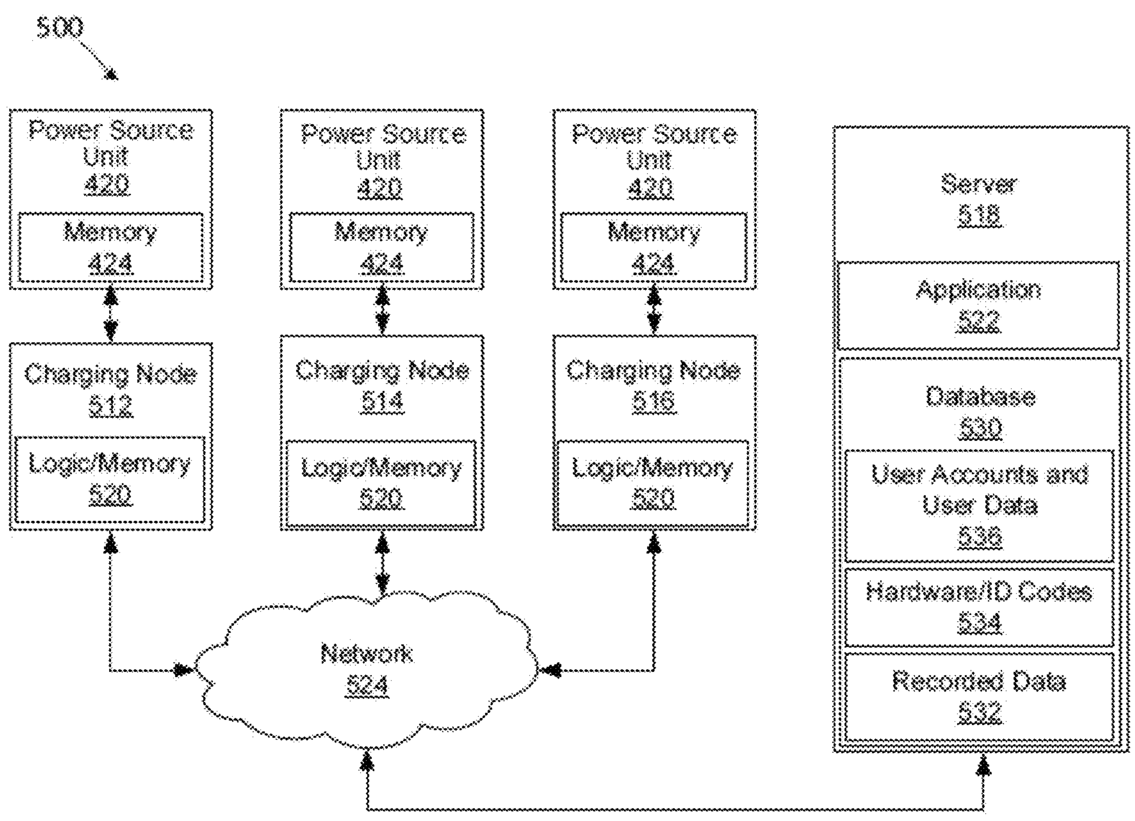
FIG. 6A is a block diagram of a data transfer and hardware tracking system, according to one or more embodiments of the disclosure.
Figure 6B:
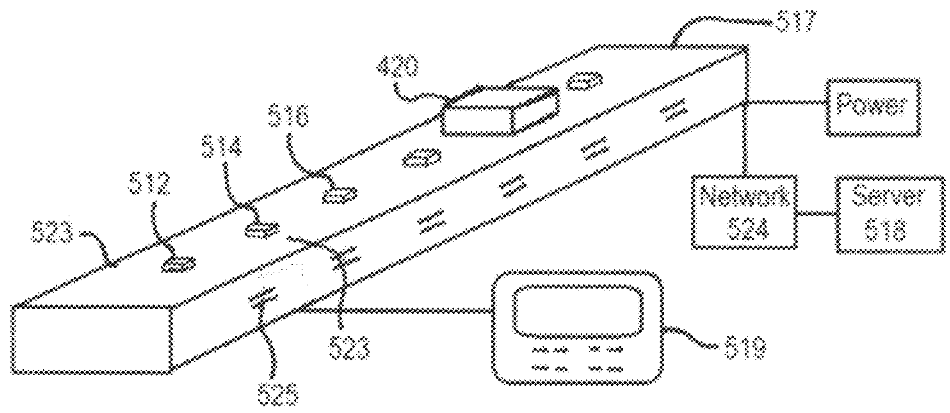
FIG. 6B is a perspective view of a docking station with battery unit attachment nodes, according to one or more embodiments.

For instance, referring to FIGS. 6A and 6B, a data transfer and hardware tracking system is depicted according to one or more embodiments of the disclosure. In one or more embodiments, the system 500 includes one or more charging nodes 512, 514, 516, that may be part of a docking station 517 and a server 518. Charging nodes are physical devices, usable by a consumer or other user, to recharge one or more power source units 420. The nodes may be integrated with the docking station 517, which is located at a law enforcement station where the law enforcement officers using the recording devices return after their shifts. However, in addition, charging nodes and/or docking station can include including processing elements, sensors, user interface, and memory 520. Seen in FIGS. 6A and 6B, nodes 512, 514, 516, and server 518, are interconnected via network 524, for communication. In one or more embodiments, the network 524 may be, for example, a local area network, a wide area network, a cloud computing environment, a public network (e.g. the internet), or other suitable network for communication between the networked elements of the system 500.

In one or more embodiments, the system 500 outputs data and receives inputs to/from users via the nodes 512, 514, 516, and server 518. For example, the nodes 512, 514, 516, and server 518 may each include input/output devices, for example a display and/or touchscreen 519, for interfacing with a user via a graphical user interface (GUI) or other user interface.

In one or more embodiments, one or more of the nodes 512, 514, 516, and server 518 includes application 522 ("App"). In some embodiments, the App 522 is a program or "software" that is stored in memory accessible by charging nodes 512, 514, 516, and server 518 for execution by logic/memory. In one or more embodiments App 522 includes a set of instructions for execution by processing elements on one or more of the charging nodes 512, 514, 516, or docking station, and server 518, for management of recorded data, hardware tracking, event tracking, and other functions. In certain embodiments, App 522 is stored locally on some or all of the nodes, or docking station, and server 512-518. In some embodiments, App 522 is stored remotely, accessible via a network.

The docking station 517 may have a plurality of assigned slots 523, each with labeled indicia 525 for receiving specifically assigned power source units, or the slots may be unassigned and receive any of the power source units 420.

In some embodiments, nodes 512, 514, 516, and server 518, are arranged in a client server architecture. For example, nodes 512-516 may be configured as clients with server 518. Depicted in FIGS. 6A-6B, server 518 is a computing node including database 530, and nodes 512, 514, 516 are clients that use App 522 to communicate with the server 518 to transfer recorded data 532 from memory 424, record/write hardware or user identification codes 534, and track/modify user accounts and user data 536. In some embodiments, App 522 is an application dedicated to data management, configured to collect user data from one or more docking power source units 420, including text, video, images, audio, and the like. In some embodiments, App 522 is a more generalized device tracking and event tracking system. In such embodiments, the App 522 is configured to associate and/or assign system hardware, such as the power source units 420 to specific users for close tracking of possession of system elements in the field.

In various embodiments App 522 may be configured to communicate with a server to create one or more user accounts. The user accounts may include an administrative account and one or more client accounts. In some embodiments, the administrative account may be a user account including privileges for configuring the system 500. For example, in some embodiments the administrative account may create or modify user accounts. In certain embodiments, the system 500 assigns/tracks possession of the devices by correlating the user account of users who physically possess certain elements of the system, such as a power source unit 420. In such embodiments, tracking of the power source unit 420 can be done via a unique hardware identifier associated with the power source unit, a software ID code, a combination, or the like. In such a manner, the user of the device and their assigned storage device 424 of the system can be mutually identified, for easy tracking of who possessed the device and when possession of the device occurred.

In some embodiments, the system can additionally include information on other hardware assigned to a user. For example, in various embodiments a hardware ID for a specific recording device 104 could be associated with a user account. Then, when the hardware ID of the power source unit 420 is subsequently associated with the user account, the system identifies which recording device it is coupled with.

The administrative account may assign which hardware codes/ID codes to specific user accounts. In some embodiments, this decision may be based on user data. For example, in some embodiments, the administrative account selectively assigns modules based on employee need, job requirements, etc. In one or more embodiments, the user data includes user information including, the user's name, date of birth, email address, phone number, and notification preferences. In some embodiments, the user data includes job information, such as, for example, the user's job, department and position.

Figure 7:
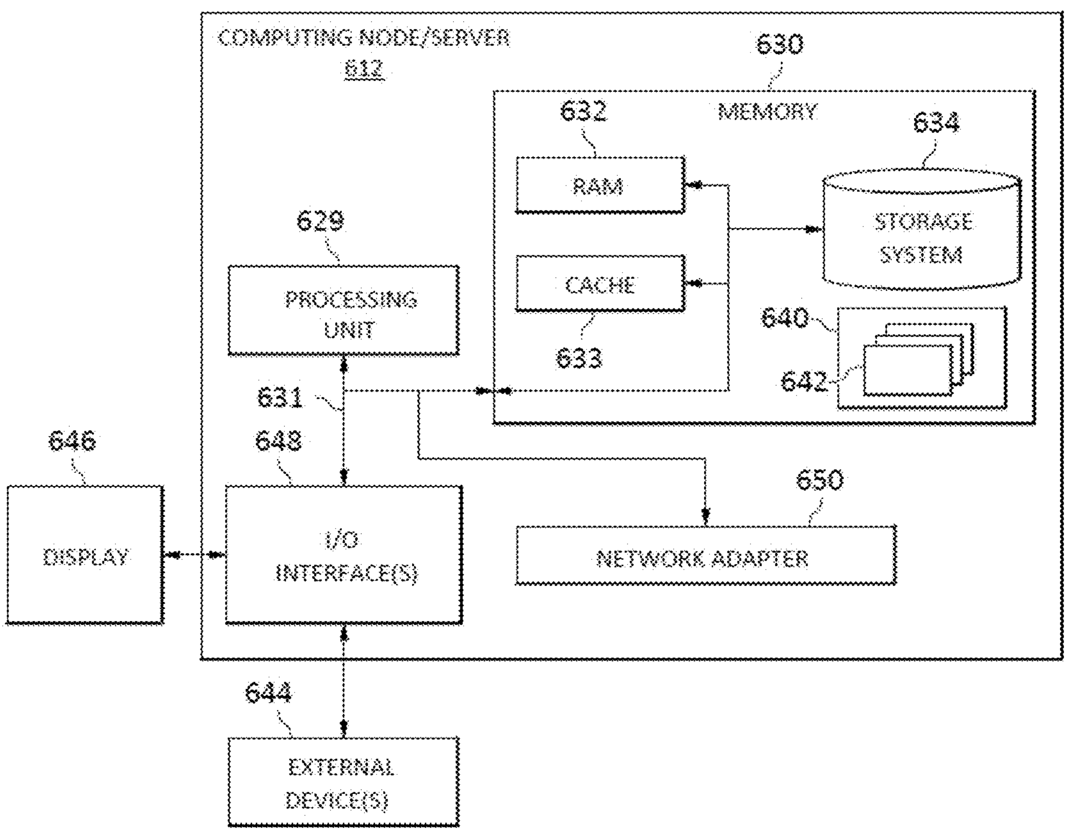
FIG. 7 is a block diagram of a computing node/server of a hardware tracking system, according to one or more embodiments of the disclosure.

Referring now to FIG. 7, a block diagram of a computing node 612 is depicted, according to one or more embodiments of the disclosure. Computing node 612 is only one example of a suitable system and is not intended to suggest any limitation as to the scope of use or functionality of the embodiments described herein. Regardless, computing node 612 is capable of being implemented and/or performing any of the functionality set forth as described herein.

Computing node/server may be is operational with numerous other general purpose or special purpose computing system environments or configurations. Examples of well-known computing systems, environments, and/or configurations that may be suitable for use with computing node/server 612 include, but are not limited to, personal computer systems, server computer systems, thin clients, thick clients, handheld or laptop devices, multiprocessor systems, microprocessor-based systems, set top boxes, programmable consumer electronics, network PCs, minicomputer systems, mainframe computer systems, and distributed computing environments that include any of the above systems or devices, and the like.

Computing node/server 612 may be described in the general context of computer system, including executable instructions, such as program modules, being executed by a computer system. Generally, program modules may include routines, programs, objects, components, logic, data structures, and so on that perform particular tasks or implement particular abstract data types. Computing node/server 612 may be practiced in distributed computing environments where tasks are performed by remote processing devices that are linked through a network. In a distributed computing environment, program modules may be located in both local and remote computer system storage media including memory storage devices.

As shown in FIG. 7, computing node/server 612 is shown in the form of a general-purpose computing device. The components of computing node/server 612 may include, but are not limited to, one or more processors or processing units 629, a system memory 630, and a bus 631 that couples various system components including system memory 630 to processor 629. Bus 631 represents one or more of any of several types of bus structures, including a memory bus or memory controller, a peripheral bus, and a processor or local bus using any of a variety of bus architectures. By way of example, and not limitation, such architectures include Industry Standard Architecture (ISA) bus, Micro Channel Architecture (MCA) bus, Enhanced ISA (EISA) bus, Video Electronics Standards Association (VESA) local bus, and Peripheral Component Interconnect (PCI) bus.

Computing node/server 612 typically includes a variety of computer readable media. Such media may be any available media that is accessible by computing node/server 612, and it includes both volatile and non-volatile media, removable and non-removable media.

System memory 630 can include computer readable media in the form of volatile memory, such as random-access memory (RAM) 32 and/or cache memory 633. Computing node/server 612 may further include other removable/non-removable, volatile/non-volatile computer storage media. By way of example only, storage system 634 can be provided for reading from and writing to a non-removable, non-volatile magnetic media (not shown and typically called a "hard drive"). Although not shown, a magnetic disk drive for reading from and writing to a removable, non-volatile magnetic disk (e.g., a "floppy disk"), and an optical disk drive for reading from or writing to a removable, non-volatile optical disk such as a CD-ROM, DVD-ROM or other optical media can be provided. In such instances, each can be connected to bus 631 by one or more data media interfaces. As will be further depicted and described below, memory 630 may include at least one program product having a set (e.g., at least one) of program modules that are configured to carry out the functions of embodiments of the disclosure.

Program/utility 640, having a set (at least one) of program modules 642, may be stored in memory 630 by way of example, and not limitation, as well as an operating system, one or more application programs, other program modules, and program data. Each of the operating system, one or more application programs, other program modules, and program data or some combination thereof, may include an implementation of a networking environment. Program modules 642 generally carry out the functions and/or methodologies of one or more of the embodiments described herein.

Computing node/server 612 may also communicate with one or more external devices 644 such as a keyboard, a pointing device, a display 646, etc.; one or more devices that enable a user to interact with computing node/server 612; and/or any devices (e.g., network card, modem, etc.) that enable computing node/server 612 to communicate with one or more other computing devices. Such communication can occur via Input/Output (I/O) interfaces 648. Still yet, computing node/server 612 can communicate with one or more networks such as a local area network (LAN), a general wide area network (WAN), and/or a public network (e.g., the Internet) via network adapter 650. As depicted, network adapter 650 communicates with the other components of computing node/server 612 via bus 631. It should be understood that, although not shown, other hardware and/or software components could be used in conjunction with computing node/server 612. Examples, include, but are not limited to, microcode, device drivers, redundant processing units, external disk drive arrays, RAID systems, tape drives, and data archival storage systems, etc.

Figures 8A, 8B:
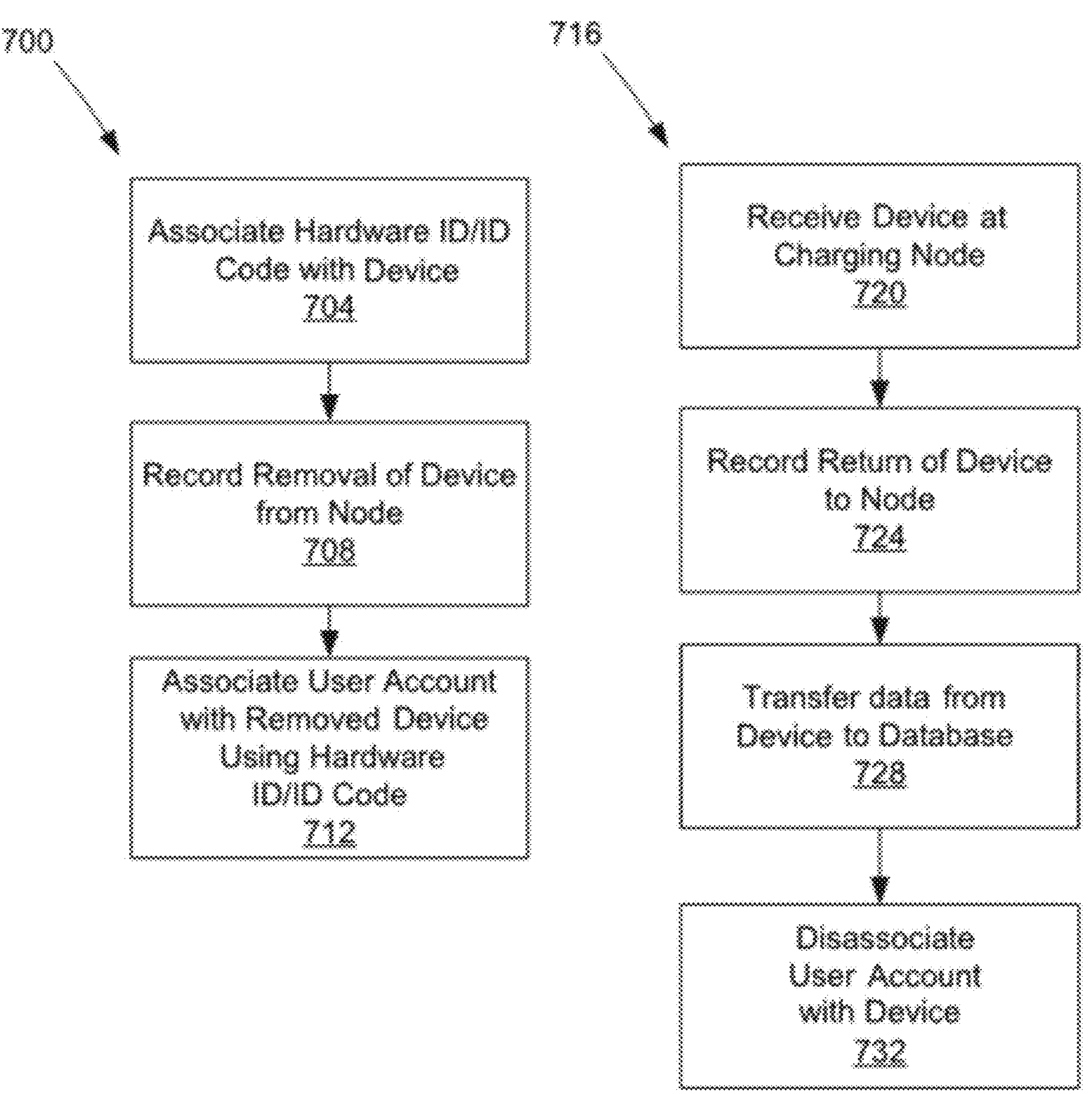
FIGS. 8A-8B depict methods for data retention and hardware tracking, according to one or more embodiments of the disclosure.
Figure 9A:
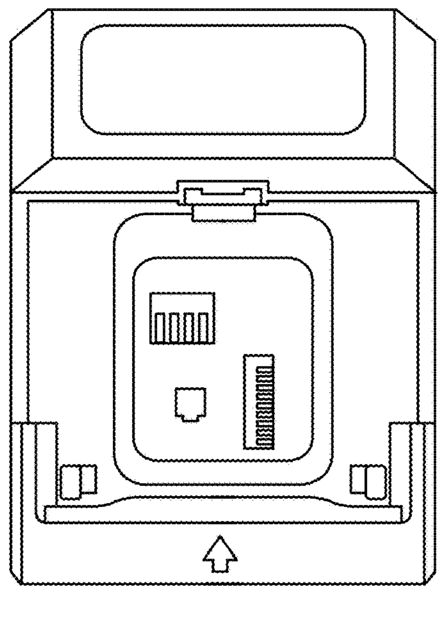
FIG. 9A is a plan view of a docking station/device with battery unit attachment nodes, according to one or more embodiments of the disclosure.
Figure 9B:
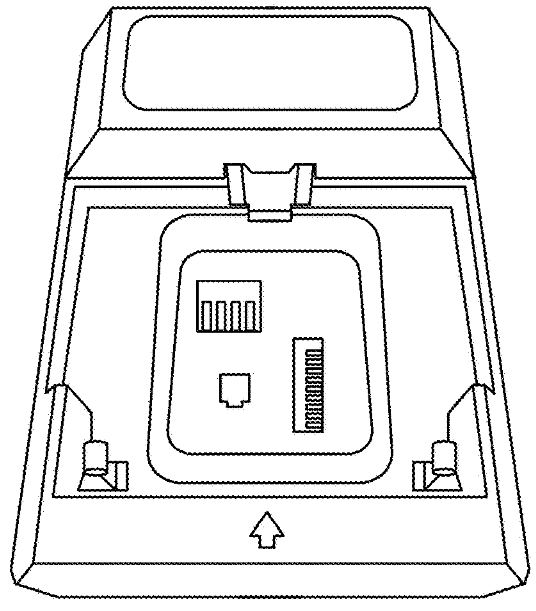
FIG. 9B is a top perspective view of the docking station/device of FIG. 9A, according to one or more embodiments of the disclosure.
Figure 9C:
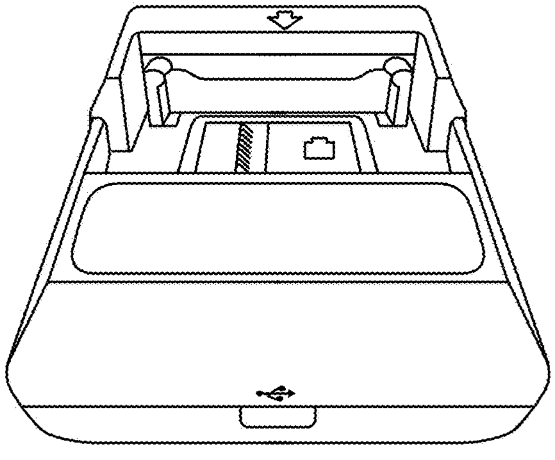
FIG. 9C is a forward end perspective view of the docking station/device of FIG. 9A, according to one or more embodiments of the disclosure.
Figure 9D:
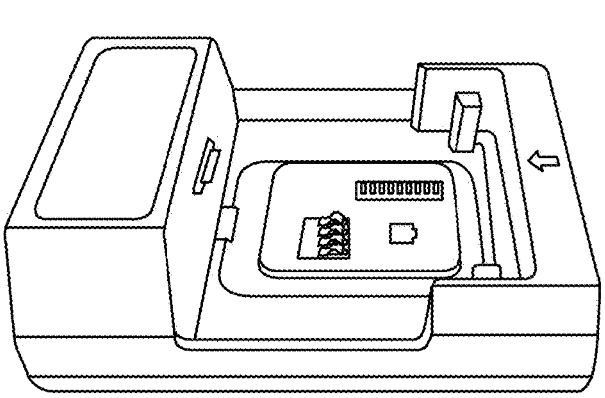
FIG. 9D is a side perspective view of the docking station/device of FIG. 9A, according to one or more embodiments of the disclosure.

Referring to FIGS. 8A-8B, methods 700, 716 of hardware tracking are depicted, according to one or more embodiments of the disclosure. In one or more embodiments, the method 700 includes, at operation 704, associating a hardware ID and/or ID code with a power source unit ("Device"). In one or more embodiments, the method 700 includes, at operation 708 recording removal of the power source unit from a charging node. In one or more embodiments, the method 700 includes, at operation 712, associating a user account with removed power source unit using hardware ID/ID Code.

In one or more embodiments, the method 716 includes, at operation 720, receiving a power source unit ("Device") at a charging node. In one or more embodiments, the method 716 includes, at operation 724, recording a return of the power source unit to the charging node. In one or more embodiments, the method 716 includes, at operation 728, transferring data from the power source unit to a database. In one or more embodiments, the method 716 includes, at operation 732, disassociating a user account with the power source unit.

In one or more embodiments, data recorded by the recording device 104, including, for example, but not limited to, video, audio and device status data, is stored in memory of the power source unit 139, 420, which may be linked to an external device for access to and/or transfer of the recorded data, physical and/or remote. In embodiments, memory of each of the recording unit 141 and the power source unit 139, 420, stores and maintains a redundant data file set that includes a portion of the recorded data. Each redundant data file set may include one or more data files having certain recording and/or status data stored therein. In embodiments, the recording unit 141 and the power source unit 139, 420, may be configured to synchronize the redundant data files of the recording unit 141 and the power source unit 139, 420, such that the data therein is mirrored. In embodiments, such redundant data files may be used for data integrity and security, verification, identification, authentication and security purposes. In one or more embodiments, redundant data files in the power source unit memory may be accessed by a server and/or external communication device and used for time-line analysis, verification of associated user and/or recording device/unit and/or device troubleshooting.

In one or more embodiments, each redundant data file of the recording unit 141 and the power source unit 139, 420 includes one or more data files having bits of certain recording and/or status data stored therein. In embodiments, the redundant data files may include, but not limited to, one or more of: date, time and/or location data; CSV files; time segments; user and/or hardware ID; recording device, recording unit and/or power source unit status data; power/charge data; and recording start/stop/interruption data. Additionally or alternatively, in embodiments, data stored in the redundant data files may include, but is not limited to, analog and frequency parameters, such as, but not limited to, pressure, temperature, current, and voltage; Boolean data such as device switch and actuator positions, indicator light illumination, and actuator commands; GPS data and/or GIS data, such as position and movement data; video and image information; audio information; programmed and device information; information about the environmental conditions; device control status and operational data generated by device systems; and data derived from a combination from any of the above including, but not limited to, additional data, video, and audio analysis and analytics.

According to one or more embodiments of the disclosure, recording device 104 is configured for and implemented in recording and/or monitoring uses and applications other than weapon mounted uses and applications. In embodiments, the recording device, comprising recording unit 141 and power source unit 139, 420, as described herein, may include the various features described herein, including, but not limited to, data transfer and collection, charging, redundancy, including recording unit/power source unit redundant data files, monitoring, communication linking, verification, identification, authentication and security features. In one or more embodiments, the recording device is configured to communicate/network with a server and/or external communication device. In one or more embodiments, a recording device or a set, kit or group of two or more of the recording devices may be associated with a common network, a server and/or an external communications device, as described herein, and may be part of a data management system for one or more recording devices, as described herein.

In one or more embodiments, the recording device 104 may include an engagement component configured to removably secure the recording device to a person, to a structure or in a particular location for recording and/or monitoring. A recording device may be secured/positioned in a location that is generally inaccessible. The recording device may be configured to record at set times or include one or more sensors, as described herein, and automatically record in response to a sensor trigger, for example, a motion sensor trigger. In embodiments, the power source unit 139/420 may be removed from the recording unit for charging and/or data transfer without detaching or moving the recording unit 141. In one or more embodiments, such tasks may also be conducted via cord and/or wireless connection.

In one or more embodiments, the recording device may be worn by or secured to a person, secured to a structure or positioned in a specific location. In embodiments, the engagement component may include, but is not limited to, one or more of: a clip, a strap, one or more magnets, a coupling, an adhesive, a hook, a slot or post, a hook and loop material, a bracket, a rail system and a mounting mechanism.

In one or more embodiments, the recording device may be configured and used as an industrial, residential and/or home recording and/or monitoring device. In embodiments, one or more of the recording devices may be used in association with a common network, server and/or external communications device, as described herein, and/or may be part of a data management system for one or more recording devices, as described herein, for industrial, residential and/or home recording and/or monitoring purposes.

Referring to FIGS. 3A-4D, which illustrated a power source unit 139, 339, a recording unit 141 decoupled from the power source unit 139, and the recording unit 141 with a backing 430 removed, respectively, according to one or more embodiments of the disclosure. In one or more embodiments, the housing 403 of the recording unit 141 defines one or more recesses 417 configured to engage a portion of the power source unit 139, 420 to form a seal (e.g., a hermetic seal), such as to prevent dust or debris to enter. In one or more embodiments, the seal is a waterproof seal. In certain embodiments, the one or more recesses 417 are on the power source unit 139, 420 and configured to engage the housing 403 to form the seal. In one or more embodiments, the power source unit 139, 420 includes a sealing member 440. The sealing member 440 is configured to engage the recess(es) 417 of the housing 403 to form a seal and prevent debris and/or liquid from entering between the power source unit 139, 420 and the housing 403 when the power source unit 139, 420 is coupled 405 to the housing 404.

In one or more embodiments, recording device 104, without rail set 130A, 130B, may have a length of about 6 inches or less and, in some embodiments, a length of 5 inches or less. In some embodiments, the recording device may have a length of about 6 inches or less, a width of about 4 inches or less and a height or thickness of about 2 inches or less. In further embodiments, the recording device may have a length of about 5 inches or less, a width of about 3 inches or less and a height of about 1.5 inches or less. In still further embodiments, the recording device may have length of about 2 to about 5 inches, a width of about 0.9 to about 2.3 inches and a height of about 0.6 to about 1.5 inches. In one or more embodiments, the recording device has a length of about 3.0 inches, a width of about 1.4 inches and a height of about 0.9 inches.

In one or more embodiments, the power source unit 139, 420, may have a length 150 of about 4 inches or less and, in some embodiments, a length 150 of 3 inches or less. In some embodiments, the power source unit may have a length 150 of about 4 inches or less, a width 152 of about 3 inches or less and a height or thickness 154 of about 1.2 inches or less. In further embodiments, the power source unit may have a length 150 of about 3 inches or less, a width 152 of about 3 inches or less and a height 154 of about 1.2 inches or less. In still further, the power source unit may have a length 150 of about 1 to about 2.5 inches, a width 152 of about 0.9 to about 2.3 inches and a height 154 of about 0.4 to about 1 inch. In still further, the power source unit may have a length 150 of about 1.3 to about 1.7 inches, a width 152 of about 1.2 to about 1.6 inches and a height 154 of about 0.5 to about 0.9 inch. In one or more embodiments, the power source unit may have a length 150 of about 1.54 inches, a width 152 of about 1.45 inches and a height 154 of about 0.72 inches.

In one or more embodiments, features of the recording device may include one or more of: 1080p HD video camera with audio, instant-on camera activation (programmed and/or sensor triggered), microphone, adjustable tactical light, ambidextrous taclight activation, USB connectivity, password protection, and USB port(s) and system status indicator lights.

U.S. Pat. Nos. 10,459,678; 10,323,903; 10,060,701; 9,658,031; 5,430,967; 6,571,503; 6,185,854; 6,705,038; 8,182,109; 9,934,623, 9,467,500; 9,958,228; 4,547,937; D873946; and D672005 are hereby incorporated by reference herein in their entirety for all purposes. In addition, U.S. Patent Publication Nos.: 2019/0222771; 2018/0106568; 2018/0196628; 2018/0238649; 2017/0155269; 2016/0172876; 2018/0321015; 2018/0299217; 2015/0184978; 2007/0061508; 2010/0178540; 2006/0204835; 2004/0244259; 2019/0304210; 2019/0063864; 2020/0109909; and 2015/0369554 are hereby incorporated by reference herein in their entirety for all purposes.

The patents, patent publications and other references mentioned above in all sections of this application are herein incorporated by reference in their entirety for all purposes. All of the features disclosed in this specification (including the references incorporated by reference, including any accompanying claims, abstract and drawings), and/or all of the steps of any method or process so disclosed, may be combined in any combination, except combinations where at least some of such features and/or steps are mutually exclusive. The invention is not restricted to the details of the foregoing embodiment(s). The invention extends to any novel one, or any novel combination, of the features disclosed in this specification (including any incorporated by reference references, any accompanying claims, abstract and drawings), or to any novel one, or any novel combination, of the steps of any method or process so disclosed.

The descriptions of the various embodiments of the present disclosure have been presented for purposes of illustration but are not intended to be exhaustive or limited to the embodiments disclosed. Many modifications and variations will be apparent to those of ordinary skill in the art without departing from the scope and spirit of the described embodiments. The terminology used herein was chosen to explain the principles of the embodiments, the practical application or technical improvement over technologies found in the marketplace, or to enable others of ordinary skill in the art to understand the embodiments disclosed herein.

What is claimed is:

1. A data management system for gun-mounted recording devices, the system comprising:

a plurality of removable power source units for use with a plurality of recording devices, each of the plurality of removable power source units including a battery for providing power to a respective recording device while attached thereto and a memory;

a plurality of charging nodes configured to receive and dock with each of the plurality of removable power source units to the batteries and configured to network with the memory; and a server device configured to network with the plurality of charging nodes, the server device comprising a processor and a second memory including a set of executable instructions in the form of a computer program product, the executable instructions executable by the processor to cause the server device to:

when a respective removable power source unit of the plurality of removable power source units is docked with a respective charging node of the plurality of charging nodes, transfer data stored in the memory of the respective removable power source unit to the second memory of the server device.

2. The data management system of claim 1, wherein the plurality of charging nodes each includes a third processor and a third memory.

3. The data management system of claim 2, wherein the third memory of each of the plurality of charging nodes includes a set of executable instructions in the form of a computer program product, the executable instructions executable by the third processor to cause the charging node to:

transfer data stored in the memory of the respective removable power source unit of the plurality of removable power source units to the second memory of the charging node when docked.

4. The data management system of claim 3, wherein the executable instructions further cause the server device to:

record removal of the respective removable power source unit of the plurality of removable power source units from a charging node.

5. The data management system of claim 1, wherein the executable instructions further cause the server device to:

associate a hardware ID or an ID code with a respective docked power source unit of the plurality of removable power source units.

6. The data management system of claim 5, wherein the executable instructions further cause the server device to:

associate a user account with the respective removable power source unit of the plurality of removable power source units using the hardware ID or the ID Code.

7. The data management system of claim 6, wherein the executable instructions further cause the server device to:

record a return of the respective removable power source unit of the plurality of removable power source units to the charging node.

8. The data management system of claim 7, wherein the executable instructions further cause the server device to:

disassociate a user account with the respective removable power source unit of the plurality of removable power source units.

9. The data management system of claim 1, wherein the plurality of charging nodes each include a user interface.

10. The data management system of claim 1, wherein each of the plurality of recording devices comprises a fourth memory, and wherein the memory of each of the plurality of removable power source devices and the fourth memory of each of the plurality of recording units includes a redundant data file set, the redundant data file set including one or more data files having bits of recording and/or status data stored therein, wherein the redundant data sets of a paired power source unit and recording device are synchronized.

11. A data management system for gun-mounted recording devices, comprising:

a computing node comprising a processor, a first memory, and a communications module;

a recording unit comprising a housing having a coupling portion and a recording module within the housing; and a power source unit removably coupled with the housing of the recording unit, the power source unit including a battery for providing power to the recording unit while attached thereto and during use, the power source unit comprising a second memory configured to store data recorded by and during use of the recording unit and a communications module configured to transmit data to and from the computing the node.

12. The data management system of claim 11, wherein the communications module of the power source unit comprises a data port.

13. The data management system of claim 12, wherein the data port is a USB port.

14. The data management system of claim 11, wherein the computing node and the power source unit communicate over a communication link.

15. The data management system of claim 14, wherein the communication link is a hard wired link.

16. The data management system of claim 14, wherein the communication link is a wireless link.

17. The data management system of claim 11, wherein the power source unit further comprises a hardware ID or an ID code.

18. The data management system of claim 17, wherein the computing node is configured to selectively associate the hardware ID or the ID code with a user account.

19. The data management system of claim 11, wherein the recording unit comprises an indicator indicating an amount of free memory available for storing data.

20. The data management system of claim 11, wherein the recording unit includes a mode wherein a user cannot modify one or more settings of the recording device.

* * * * *